(12) United States Patent
Lei et al.

(10) Patent No.: US 11,659,531 B2
(45) Date of Patent: May 23, 2023

(54) SIGNALING TO ADJUST SLOT FORMAT IN A WIRELESS COMMUNICATION SYSTEM

(71) Applicant: QUALCOMM Incorporated, San Diego, CA (US)

(72) Inventors: Jing Lei, San Diego, CA (US); Yi Huang, San Diego, CA (US); Wanshi Chen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/235,102

(22) Filed: Apr. 20, 2021

(65) Prior Publication Data

US 2021/0337539 A1 Oct. 28, 2021

Related U.S. Application Data

(60) Provisional application No. 63/013,932, filed on Apr. 22, 2020.

(51) Int. Cl.
*H04W 4/00* (2018.01)
*H04W 72/0446* (2023.01)
(Continued)

(52) U.S. Cl.
CPC .......... *H04W 72/0446* (2013.01); *H04L 5/16* (2013.01); *H04W 72/042* (2013.01)

(58) Field of Classification Search
CPC .......... H04W 72/0446; H04W 72/042; H04W 72/048; H04L 5/16; H04L 5/0092; H04L 1/1887; H04L 5/14
See application file for complete search history.

(56) References Cited

U.S. PATENT DOCUMENTS

2015/0326381 A1* 11/2015 Sakhnini ............... H04L 5/16
370/281
2018/0343105 A1* 11/2018 Wang ...................... H04L 5/001
(Continued)

FOREIGN PATENT DOCUMENTS

WO WO-2019030378 A1 2/2019
WO WO-2021087504 A1 5/2021

OTHER PUBLICATIONS

International Search Report and Written Opinion—PCT/US2021/028408—ISA/EPO—dated Jul. 9, 2021.

*Primary Examiner* — Abdelnabi O Musa
(74) *Attorney, Agent, or Firm* — Holland & Hart LLP

(57) ABSTRACT

Methods, systems, and devices for wireless communications are described. In some systems, a user equipment (UE) may determine to change a first slot format used when operating in a half-duplex mode based on a traffic pattern or a channel quality, or both, and may transmit a request to change the slot format to a base station. The request may include information relating to a slot format based on the traffic pattern or the channel quality, or both, such as an explicit indication of a slot format or a request for a different resource distribution between uplink symbols, downlink symbols, or flexible symbols, or any combination thereof. The base station may receive the request to change the slot format and may transmit an indication of a second slot format to the UE based on the request. The base station and the UE may communicate using the second slot format.

30 Claims, 23 Drawing Sheets

(51) Int. Cl.
*H04W 72/04* (2023.01)
*H04L 5/16* (2006.01)

(56) References Cited

U.S. PATENT DOCUMENTS

| | | |
|---|---|---|
| 2019/0045495 A1* | 2/2019 | Chen .................... H04L 5/0007 |
| 2019/0173633 A1* | 6/2019 | Kwak ................ H04W 72/1268 |
| 2019/0268903 A1* | 8/2019 | Lee ........................ H04L 5/0053 |
| 2019/0312665 A1* | 10/2019 | Jo ........................ H04L 27/2607 |
| 2019/0335493 A1* | 10/2019 | Xiong ............... H04W 72/1289 |
| 2020/0120672 A1* | 4/2020 | Shen .................... H04L 1/1614 |
| 2020/0252176 A1* | 8/2020 | Falahati ................ H04L 5/0044 |
| 2020/0260417 A1* | 8/2020 | Jo ...................... H04W 72/0446 |
| 2020/0382267 A1* | 12/2020 | Soriaga .................. H04L 5/001 |
| 2020/0413463 A1* | 12/2020 | Ouchi ................... H04L 1/1822 |
| 2021/0067308 A1* | 3/2021 | Ly ........................ H04L 5/0051 |
| 2021/0092739 A1* | 3/2021 | Choi ................ H04W 72/0446 |
| 2021/0243609 A1* | 8/2021 | Lei ...................... H04W 72/042 |
| 2021/0274544 A1* | 9/2021 | Yang ...................... H04W 72/14 |
| 2021/0345293 A1* | 11/2021 | Park ........................ H04B 7/08 |
| 2021/0367660 A1* | 11/2021 | Jo ...................... H04B 7/15542 |
| 2022/0295506 A1* | 9/2022 | Lee ....................... H04W 72/10 |

* cited by examiner

SIGNALING TO ADJUST SLOT FORMAT IN A WIRELESS COMMUNICATION SYSTEM

CROSS REFERENCE

The present Application for Patent claims the benefit of U.S. Provisional Patent Application No. 63/013,932 by Lei et al., entitled "SIGNALING TO ADJUST SLOT FORMAT," filed Apr. 22, 2020, assigned to the assignee hereof, and expressly incorporated by reference herein.

TECHNICAL FIELD

The following relates generally to wireless communications and more specifically to signaling to adjust slot format.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support half-duplex communications with a base station and, as such, may transmit and receive during non-overlapping time intervals. In some cases, the base station may configure the UE with a slot format and the UE may communicate with the base station using the configured slot format.

SUMMARY

The described techniques relate to improved methods, systems, devices, and apparatuses that support signaling to adjust slot format. Generally, the described techniques provide for an enhanced control message that a user equipment (UE) may transmit to a base station to request a slot format change. For example, the UE may determine that a currently configured slot format (e.g., a first slot format) used for communications between the base station and the UE results in a sub-optimal use of communication resources based on an amount of uplink data to be transmitted between the UE and the base station or a quality of a channel or a link over which the base station and the UE may communicate, or both. Accordingly, in such examples, the UE may transmit the request for the slot format change to the base station. The UE may include the request for the slot format change in a control message, such as in uplink control information (UCI), a media access control (MAC) control element (CE), or a radio resource control (RRC) message.

In some examples, the control message may include a field including the request to change the slot format. As described in more detail herein, the field may be a slot format change field, a scheduling request field, or a quantized or compressed buffer status report (BSR) field, which may be an example of a compact BSR (C-BSR) or a lightweight BSR (LW-BSR). In some examples, the request may include an explicit indication of a slot format based on the amount of data to be transmitted by the UE or the quality of the channel or the link between the base station and the UE. In some other examples, the request may be a request for a different distribution of resources in a slot (e.g., a different allocation of downlink, uplink, or flexible symbols in a slot) based on the amount of data to be transmitted by the UE or the quality of the channel or the link between the base station and the UE. In other words, the UE may request a slot format with a different quantity of resources allocated for uplink communication, a different quantity of resources allocated for downlink communication, or a different quantity of resources allocated for flexible communication (e.g., either downlink or uplink), or any combination thereof, based on a traffic load or a channel or link quality.

The base station may receive the request to change the slot format from the UE in the uplink control message and may select a slot format (e.g., a second slot format) based on the request. In some examples, the base station may identify an explicitly indicated slot format and, accordingly, may select the indicated slot format. In some other examples, the base station may identify a request for a slot format with a different distribution or ratio of resources and the base station may select a slot format that is compatible with the requested distribution or ratio. The base station may transmit an indication of the selected slot format to the UE via a downlink control message, such as downlink control information (DCI). In some implementations, the base station may transmit an explicit indication of the selected slot format to the UE. In some other implementations, the base station may transmit an index value to the UE and the UE may select a slot format stored in a memory of the UE corresponding to the index value. As such, the base station may configure the UE with a slot format based on the request provided by the UE, which, in turn, may be based on the amount of data to be transmitted by the UE or the quality of the channel or the link between the base station and the UE. Accordingly, the base station and the UE may communicate using a slot format which may enable more optimal communications between the base station and the UE.

A method of wireless communications at a UE is described. The method may include determining to change a slot format used by communication resources including an uplink channel and a downlink channel, the communication resources operating in a half-duplex mode using a first slot format, transmitting, to a base station, a control message that includes a request to change the slot format used by the communication resources based on determining to change the slot format, receiving, from the base station, an indication of a second slot format for communicating information over the communication resources based on transmitting the request, and communicating, with the base station, the information over the communication resources using the second slot format based on receiving the indication.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to determine to change a slot format used by communication resources including an uplink channel and a downlink channel, the communication resources operating in a half-duplex mode using a first slot format, transmit, to a base station, a control message that includes a request to change the slot format used by the communication resources based on determining to change the slot format, receive, from the base station, an indication of a second slot format for communicating information over the communication resources based on transmitting the request, and communicate, with the base station, the information over the communication resources using the second slot format based on receiving the indication.

Another apparatus for wireless communications at a UE is described. The apparatus may include means for determining to change a slot format used by communication resources including an uplink channel and a downlink channel, the communication resources operating in a half-duplex mode using a first slot format, transmitting, to a base station, a control message that includes a request to change the slot format used by the communication resources based on determining to change the slot format, receiving, from the base station, an indication of a second slot format for communicating information over the communication resources based on transmitting the request, and communicating, with the base station, the information over the communication resources using the second slot format based on receiving the indication.

A non-transitory computer-readable medium storing code for wireless communications at a UE is described. The code may include instructions executable by at least one processor to determine to change a slot format used by communication resources including an uplink channel and a downlink channel, the communication resources operating in a half-duplex mode using a first slot format, transmit, to a base station, a control message that includes a request to change the slot format used by the communication resources based on determining to change the slot format, receive, from the base station, an indication of a second slot format for communicating information over the communication resources based on transmitting the request, and communicate, with the base station, the information over the communication resources using the second slot format based on receiving the indication.

Some examples of the method, apparatuses, and non-transitory computer-readable medium described herein may further include operations, features, means, or instructions for selecting, by the UE, the second slot format for communicating the information over the communication resources, where transmitting the control message may be based on selecting the second slot format, where the request to change the slot format used by the communication resources includes the second slot format.

Some examples of the method, apparatuses, and non-transitory computer-readable medium described herein may further include operations, features, means, or instructions for determining an index value corresponding to the second slot format selected by the UE, where the request to change the slot format used by the communication resources includes the index value.

Some examples of the method, apparatuses, and non-transitory computer-readable medium described herein may further include operations, features, means, or instructions for receiving, from the base station, system information that includes a set of slot formats supported by the base station, the set of slot formats including the first slot format and the second slot format, where determining to change the slot format may be based on receiving the set of slot formats, where determining the index value corresponding to the second slot format may be based on receiving the set of slot formats.

Some examples of the method, apparatuses, and non-transitory computer-readable medium described herein may further include operations, features, means, or instructions for determining, by the UE, to change a resource allocation for the uplink channel, to change a resource allocation for the downlink channel, to change a time duration spanned by a number of flexible symbols, or any combination thereof, and selecting a flag to include in the control message based on determining to change the resource allocation for the uplink channel, to change the resource allocation for the downlink channel, or to change the time duration spanned by the number of flexible symbols, or any combination thereof, where transmitting the control message may be based on selecting the flag.

In some examples of the method, apparatuses, and non-transitory computer-readable medium described herein, selecting the flag may include operations, features, means, or instructions for selecting a first flag value based on determining to change the resource allocation for the uplink channel, selecting a second flag value based on determining to change the resource allocation for the downlink channel, or selecting a third flag value based on determining to change the time duration spanned by the number of flexible symbols.

Some examples of the method, apparatuses, and non-transitory computer-readable medium described herein may further include operations, features, means, or instructions for transmitting, to the base station, a flag in the control message to change a resource allocation for the uplink channel, to change a resource allocation for the downlink channel, or to change a time duration spanned by a number of flexible symbols, or any combination thereof, where the request to change the slot format used by the communication resources includes the includes the flag.

In some examples of the method, apparatuses, and non-transitory computer-readable medium described herein, the flag indicates changing a ratio of a first set of time-domain resources allocated to the uplink channel and a second set of time-domain resources allocated to the downlink channel, and where a value of the flag may be associated with one or more slot formats.

Some examples of the method, apparatuses, and non-transitory computer-readable medium described herein may further include operations, features, means, or instructions for generating a scheduling request including the request to change the slot format used by the communication resources, where the control message transmitted by the UE includes the scheduling request.

Some examples of the method, apparatuses, and non-transitory computer-readable medium described herein may further include operations, features, means, or instructions for determining a quantity of resources for the uplink channel, where the request to change the slot format used by the communication resources includes the quantity of resources for the uplink channel and a timer to receive the indication of the second slot format or a second resource allocation.

Some examples of the method, apparatuses, and non-transitory computer-readable medium described herein may further include operations, features, means, or instructions for generating a BSR that includes the request to change the slot format used by the communication resources, where the control message transmitted by the UE includes the BSR.

Some examples of the method, apparatuses, and non-transitory computer-readable medium described herein may further include operations, features, means, or instructions for receiving, from the base station, a mapping table associated with a mapping between an amount of the information in a data buffer and an indication in the BSR, where generating the BSR may be based on the mapping table.

Some examples of the method, apparatuses, and non-transitory computer-readable medium described herein may further include operations, features, means, or instructions for receiving, from the base station, a set of thresholds associated with a payload size of the control message, the BSR, an amount of the information in a data buffer, or any combination thereof, where generating the BSR may be based on the set of thresholds.

In some examples of the method, apparatuses, and non-transitory computer-readable medium described herein, the BSR includes a quantized or compressed BSR in an uplink control channel relative to a second BSR in an uplink shared channel.

Some examples of the method, apparatuses, and non-transitory computer-readable medium described herein may further include operations, features, means, or instructions for generating a timer to indicate a duration associated with receiving the indication of the second slot format, where the control message includes the timer.

Some examples of the method, apparatuses, and non-transitory computer-readable medium described herein may further include operations, features, means, or instructions for receiving, from the base station, system information that includes a set of slot formats supported by the base station, the set of slot formats including the first slot format and the second slot format, where determining to change the slot format may be based on receiving the system information that includes the set of slot formats.

In some examples of the method, apparatuses, and non-transitory computer-readable medium described herein, receiving the indication of the second slot format may include operations, features, means, or instructions for receiving, from the base station, DCI that includes the indication of the second slot format, where the indication of the second slot format may be an index into a memory at the UE corresponding to the second slot format.

Some examples of the method, apparatuses, and non-transitory computer-readable medium described herein may further include operations, features, means, or instructions for transmitting, to the base station, a second control message that includes a second request to change the slot format used by the communication resources to a default slot format based on a completion of communicating the information over the communication resources using the second slot format.

Some examples of the method, apparatuses, and non-transitory computer-readable medium described herein may further include operations, features, means, or instructions for determining a timer associated with receiving the indication of the second slot format, where the timer corresponds to a duration during which the UE may receive the indication of the second slot format, where transmitting the request to change the slot format may be based on determining the timer associated with receiving the indication of the second slot format.

Some examples of the method, apparatuses, and non-transitory computer-readable medium described herein may further include operations, features, means, or instructions for determining to change the slot format used by the communication resources may be based on an amount of the information or a channel quality, or both.

In some examples of the method, apparatuses, and non-transitory computer-readable medium described herein, the indication may be received via RRC signaling.

In some examples of the method, apparatuses, and non-transitory computer-readable medium described herein, the half-duplex mode of the communication resources includes a half-duplex frequency division duplexing (FDD) mode.

In some examples of the method, apparatuses, and non-transitory computer-readable medium described herein, the control message includes a UCI message, a MAC-CE, or an RRC message.

In some examples of the method, apparatuses, and non-transitory computer-readable medium described herein, the request to change the slot format used by the communication resources may be multiplexed with one or more other fields in the control message.

In some examples of the method, apparatuses, and non-transitory computer-readable medium described herein, the request to change the slot format may be transmitted using the first slot format.

A method of wireless communications at a base station is described. The method may include receiving, from a UE, a control message that includes a request to change a slot format used by communication resources including an uplink channel and a downlink channel, determining to change the slot format used by the communication resources based on receiving the request, the communication resources operating in a half-duplex mode using a first slot format, transmitting, to the UE, an indication of a second slot format for communicating information over the communication resources based on determining to change the slot format used by the communication resources, and communicating, with the UE, the information over the communication resources using the second slot format based on transmitting the indication.

An apparatus for wireless communications at a base station is described. The apparatus may include a processor, memory coupled (e.g., operatively, communicatively, functionally, electronically, or electrically) to the at least one processor, and instructions stored in the memory. The instructions may be executable by the at least one processor to cause the apparatus to receive, from a UE, a control message that includes a request to change a slot format used by communication resources including an uplink channel and a downlink channel, determine to change the slot format used by the communication resources based on receiving the request, the communication resources operating in a half-duplex mode using a first slot format, transmit, to the UE, an indication of a second slot format for communicating information over the communication resources based on determining to change the slot format used by the communication resources, and communicate, with the UE, the information over the communication resources using the second slot format based on transmitting the indication.

Another apparatus for wireless communications at a base station is described. The apparatus may include means for receiving, from a UE, a control message that includes a request to change a slot format used by communication resources including an uplink channel and a downlink channel, determining to change the slot format used by the communication resources based on receiving the request, the communication resources operating in a half-duplex mode using a first slot format, transmitting, to the UE, an indication of a second slot format for communicating information over the communication resources based on determining to change the slot format used by the communication resources, and communicating, with the UE, the information over the communication resources using the second slot format based on transmitting the indication.

A non-transitory computer-readable medium storing code for wireless communications at a base station is described. The code may include instructions executable by at least one processor to receive, from a UE, a control message that includes a request to change a slot format used by communication resources including an uplink channel and a downlink channel, determine to change the slot format used by the communication resources based on receiving the request, the communication resources operating in a half-duplex mode using a first slot format, transmit, to the UE, an indication of a second slot format for communicating information over the communication resources based on determining to change the slot format used by the communication resources, and communicate, with the UE, the information over the communication resources using the second slot format based on transmitting the indication.

Some examples of the method, apparatuses, and non-transitory computer-readable medium described herein may further include operations, features, means, or instructions for identifying, by the base station, the second slot format for communicating the information over the communication resources based on the request including the second slot format, where transmitting the indication of the second slot format may be based on identifying the second slot format.

Some examples of the method, apparatuses, and non-transitory computer-readable medium described herein may further include operations, features, means, or instructions for determining an index value corresponding to the second slot format, where identifying the second slot format may be based on determining the index value, where the request to change the slot format used by the communication resources includes the index value.

Some examples of the method, apparatuses, and non-transitory computer-readable medium described herein may further include operations, features, means, or instructions for transmitting, to the UE, system information that includes a set of slot formats supported by the base station, the set of slot formats including the first slot format and the second slot format, where determining the index value corresponding to the second slot format may be based on the set of slot formats.

Some examples of the method, apparatuses, and non-transitory computer-readable medium described herein may further include operations, features, means, or instructions for receiving, from the UE, a flag in the control message to change a resource allocation for the uplink channel, to change a resource allocation for the downlink channel, to change a time duration spanned by a number of flexible symbols, or any combination thereof, where the request to change the slot format used by the communication resources includes the flag.

In some examples of the method, apparatuses, and non-transitory computer-readable medium described herein, the flag indicates changing a ratio of a first set of time-domain resources allocated to the uplink channel and a second set of time-domain resources allocated to the downlink channel.

Some examples of the method, apparatuses, and non-transitory computer-readable medium described herein may further include operations, features, means, or instructions for receiving, from the UE, a scheduling request that includes the request to change the slot format used by the communication resources, where the control message received from the UE includes the scheduling request, where determining to change the slot format may be based on receiving the scheduling request.

Some examples of the method, apparatuses, and non-transitory computer-readable medium described herein may further include operations, features, means, or instructions for determining a quantity of resources for the uplink channel, where the request to change the slot format used by the communication resources includes the quantity of resources for the uplink channel and a timer to receive the indication of the second slot format or a second resource allocation.

Some examples of the method, apparatuses, and non-transitory computer-readable medium described herein may further include operations, features, means, or instructions for receiving, from the UE, a BSR that includes the request to change the slot format used by the communication resources, where the control message received from the UE includes the BSR.

Some examples of the method, apparatuses, and non-transitory computer-readable medium described herein may further include operations, features, means, or instructions for transmitting, to the UE, a mapping table associated with a mapping between an amount of the information in a data buffer and an indication in the BSR, where the BSR may be based on the mapping table.

Some examples of the method, apparatuses, and non-transitory computer-readable medium described herein may further include operations, features, means, or instructions for transmitting, to the UE, a set of thresholds associated with a payload size of the control message, the BSR, an amount of the information in a data buffer, or any combination thereof, where the BSR may be based on the set of thresholds.

In some examples of the method, apparatuses, and non-transitory computer-readable medium described herein, the BSR includes a quantized or compressed BSR in an uplink control channel relative to a second BSR in an uplink shared channel.

Some examples of the method, apparatuses, and non-transitory computer-readable medium described herein may further include operations, features, means, or instructions for generating a timer to indicate a duration associated with transmitting the indication of the second slot format, where the control message includes the timer.

Some examples of the method, apparatuses, and non-transitory computer-readable medium described herein may further include operations, features, means, or instructions for transmitting, to the UE, system information that includes a set of slot formats supported by the base station, the set of slot formats including the first slot format and the second slot format, where determining to change the slot format may be based on transmitting the system information that includes the set of slot formats.

In some examples of the method, apparatuses, and non-transitory computer-readable medium described herein, transmitting the indication of the second slot format may include operations, features, means, or instructions for transmitting, to the UE, DCI that includes the indication of the second slot format, where the indication of the second slot format may be an index into a memory at the UE corresponding to the second slot format.

Some examples of the method, apparatuses, and non-transitory computer-readable medium described herein may further include operations, features, means, or instructions for receiving, from the UE, a second control message that includes a second request to change the slot format used by the communication resources to a default slot format based on a completion of communicating the information over the communication resources using the second slot format.

Some examples of the method, apparatuses, and non-transitory computer-readable medium described herein may further include operations, features, means, or instructions for determining a timer associated with transmitting the indication of the second slot format, where the timer corresponds to a duration during which the base station may transmit the indication of the second slot format, where receiving the request to change the slot format may be based on determining the timer associated with transmitting the indication of the second slot format.

In some examples of the method, apparatuses, and non-transitory computer-readable medium described herein, the indication may be received via RRC signaling.

In some examples of the method, apparatuses, and non-transitory computer-readable medium described herein, the half-duplex mode of the communication resources includes a half-duplex FDD mode.

In some examples of the method, apparatuses, and non-transitory computer-readable medium described herein, the control message includes a UCI message, a MAC-CE, or an RRC message.

In some examples of the method, apparatuses, and non-transitory computer-readable medium described herein, the request to change the slot format used by the communication resources may be multiplexed with one or more other fields in the control message.

In some examples of the method, apparatuses, and non-transitory computer-readable medium described herein, the request to change the slot format may be received using the first slot format.

DETAILED DESCRIPTION

Figure 1:
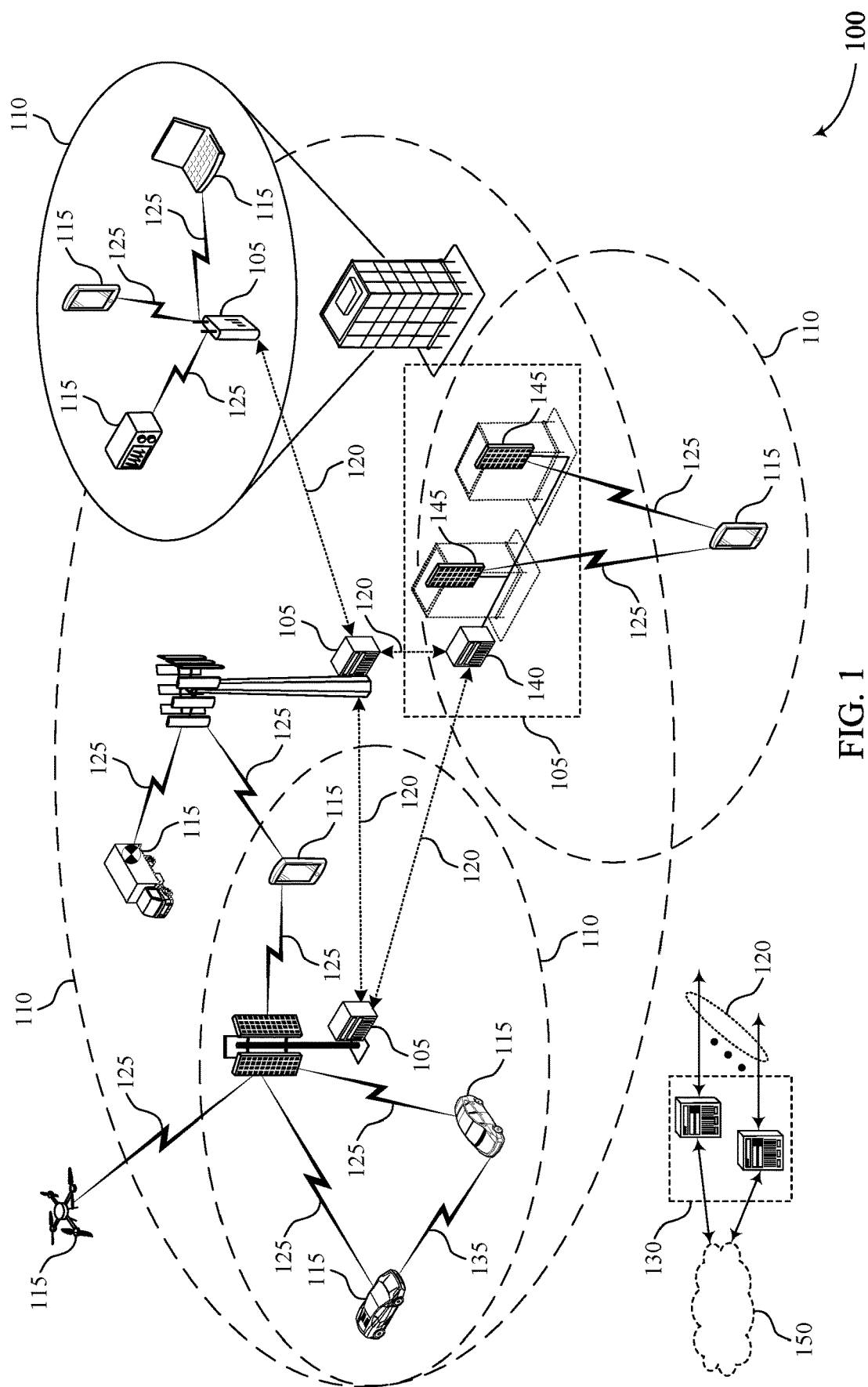
FIG. 1 illustrates an example of a wireless communications system that supports signaling to adjust slot format in accordance with aspects of the present disclosure.

In some wireless communications systems, a base station and a user equipment (UE) may support half-duplex communications and, as such, may communicate over an uplink channel and over a downlink channel during non-overlapping time intervals. For example, the base station and the UE may support half-duplex frequency division duplexing (HD-FDD) communications. Accordingly, the base station may configure the UE with a slot format that may allocate a first quantity of time resources (e.g., symbols or slots) for uplink communications from the UE to the base station and a second quantity of non-overlapping time resources (e.g., symbols or slots) for downlink communications from the base station to the UE. In some cases, the base station may configure the UE with the slot format semi-statically. For example, the base station may semi-statically configure the slot format at the UE upon establishment of a radio resource control (RRC) connection between the base station and the UE.

In some cases, however, semi-static slot formats may result in inefficiently used communication resources. For example, in some wireless communications systems, such as in fifth generation (5G) new radio (NR) systems, traffic patterns between the base station and the UE may vary on short time-scales. Additionally or alternatively, a quality of a channel or a link over which the base station and the UE may communicate may similarly change on short time scales (e.g., due to movement of the UE or the presence of an object between the base station and the UE). In either case, the UE may determine that a currently configured slot format may allocate insufficient resources for uplink communications or downlink communications. In other words, the UE may determine that the currently configured slot format may allocate a sub-optimal ratio of uplink resources to downlink resources.

In some implementations of the present disclosure, the base station and the UE may support a control message that the UE may use to transmit a request for a slot format change to the base station based on a current traffic load or a current channel quality, or both. In some aspects, the control message may be an uplink control information (UCI) message, a media access control (MAC) control element (CE), or an RRC message and the UE may map the control message to an uplink control channel or to an uplink shared channel. In some examples, the UE may transmit the request to change the slot format in a field of the control message. For example, the UE may transmit the request for the slot format change in a change of slot format field, a scheduling request field, or a buffer status report (BSR) field (e.g., a compact buffer status report (C-BSR)). In some implementations, the request to change the slot format may include a slot format index that the base station uses to identify a slot format. In some other implementations, the request to change the slot format may include a flag or a bit value that the UE may toggle or adjust to request the base station to select a slot format including a different amount or quantity of uplink symbols, downlink symbols, flexible symbols, or any combination thereof.

Particular aspects of the subject matter described herein may be implemented to realize one or more potential advantages. For example, the described techniques may enable the UE to dynamically request a different slot format based on the amount of data to be transmitted or a quality of a channel or a link over which the base station and the UE may communicate. As such, the base station and the UE may communicate using a more efficient slot format and, accordingly, may achieve a greater system throughput. Further, in some examples, the UE may communicate with the base station in a HD-FDD mode, which may enable an advantageous balance of complexity reduction, power savings, and scheduling flexibility.

Aspects of the disclosure are initially described in the context of wireless communications systems. Aspects of the disclosure are additionally described in the context of a process flow. Aspects of the disclosure are further illustrated by and described with reference to apparatus diagrams, system diagrams, and flowcharts that relate to signaling to adjust slot format.

FIG. 1 illustrates an example of a wireless communications system 100 that supports signaling to adjust slot format in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission-based) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT) or FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission-based communications. The UEs 115 may be designed to support ultra-reliable, or low-latency functions (e.g., mission-based functions). Ultra-reliable communications may include private communication or group communication and may be supported by one or more mission-based services such as mission-based push-to-talk (MCPTT), mission-based video (MCVideo), or mission-based data (MCData). Support for mission-based functions may include prioritization of services, and mission-based services may be used for public safety or general commercial applications. The terms ultra-reliable, low-latency, mission-based, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may communicate according to a configured slot format used by communication resources including an uplink channel and a downlink channel. In some aspects, the base station 105 and the UE 115 may communicate in a HD-FDD mode and, as such, the uplink channel and the downlink channel may occupy non-overlapping resources in both time and frequency. In some implementations of the present disclosure, the UE 115 may determine that an updated distribution of resources (e.g., time-domain resources) between an uplink channel and a downlink channel may more efficiently communicate information between the base station 105 and the UE 115. The UE 115 may transmit, to the base station 105, a request to change the slot format for subsequent communications between the base station 105 and the UE 115.

The UE 115 may transmit the request to change the slot format to the base station 105 via layer 1, layer 2, or layer 3 signaling, such as in a UCI message, a MAC-CE, or an RRC message. The base station 105, based on receiving the request to change the slot format from the UE 115, may determine to configure a different slot format at the UE 115 for subsequent communications between the base station 105 and the UE 115. Additional details relating to the request to change the slot format transmitted by the UE 115 and the determination of a new slot format by the base station 105 are described herein, including with reference to FIGS. 2 and 3. Upon configuration of a new slot format at the UE 115, the base station 105 and the UE 115 may communicate using the second slot format.

Figure 2:
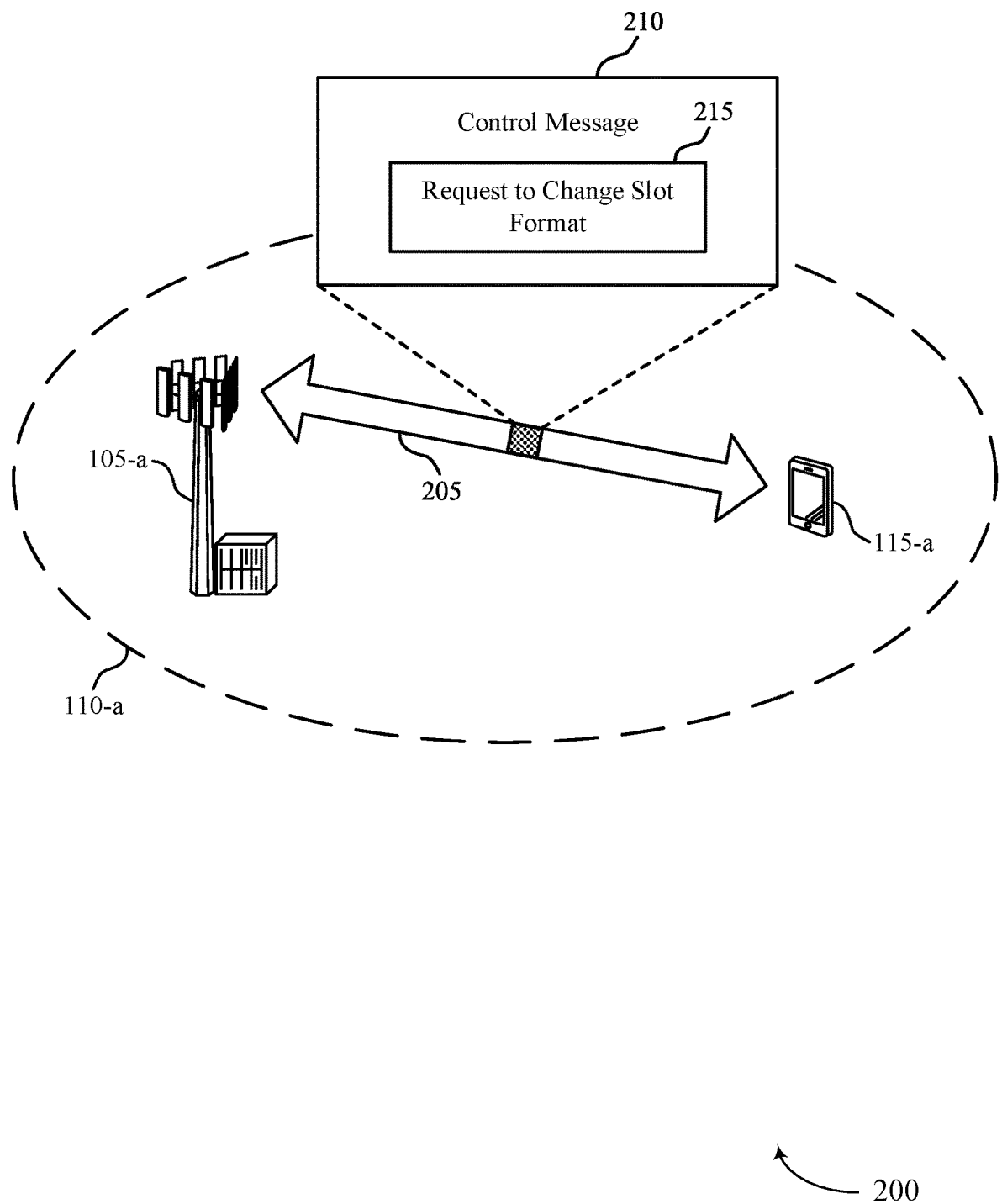
FIG. 2 illustrates an example of a wireless communications system that supports signaling to adjust slot format in accordance with aspects of the present disclosure.

FIG. 2 illustrates an example of a wireless communications system 200 that supports signaling to adjust slot format in accordance with aspects of the present disclosure. In some examples, the wireless communications system 200 may implement aspects of the wireless communications system 100. For example, the wireless communications system 200 may include a base station 105-a and a UE 115-a, which may be examples of corresponding devices as described herein, including with reference to FIG. 1. In some examples, the wireless communications system 200 may be a 5G NR system and, likewise, the base station 105-a and the UE 115-a may support wireless communications over a 5G NR radio frequency band. The base station 105-a and the UE 115-a may communicate via a communication link 205 within a geographic coverage area 110-a. In some examples, the UE 115-a may determine that a currently configured slot format is sub-optimal based on an amount of data to be transmitted or a quality of the communication link 205, such as the quality of a channel or a medium between the base station 105-a and the UE 115-a. Accordingly, the UE 115-a may transmit, to the base station 105-a, a request to change the slot format 215 in a control message 210.

In some cases, the base station 105-a may semi-statically configure the UE 115-a with a slot format that the base station 105-a and the UE 115-a may use for communications. In some aspects, the UE 115-a may be a reduced capability device (e.g., a RedCap device or a RedCap UE) and the UE 115-a may communicate in a half-duplex mode (e.g., a HD-FDD mode). For example, the UE 115-a may be configured with one or multiple FDD bands and a half-duplex FDD mode may reduce the complexity and cost of the UE 115-a. Moreover, a half-duplex FDD mode may be associated with more relaxed communication timelines as compared to full-duplex modes, which may also reduce the complexity and cost of the UE 115-a.

In some cases, the base station 105-a may communicate using a full-duplex mode and the UE 115-a may communicate using a half-duplex mode and, as such, the base station 105-a and the UE 115-a may communicate in radio frequency spectrum bands that support paired spectrums. For example, in a 5G NR system, the base station 105-a and the UE 115-a may communicate over the FRI radio frequency spectrum band. In some examples, a HD-FDD mode may refer to communications that use a first set of frequency resources for uplink communications and a second set of frequency resources for downlink communications where the UE or base station can communicate using the first set of frequency resources or the second set of frequencies during a time duration, but not both. For example, the UE 115-a may couple an antenna with a receive chain or a transmit chain of radio frequency components during a time duration, but not both at the same time. By restricting communications to either uplink or downlink during a given set of time resources, the UE may be configured to reduce energy consumption. For example, a UE 115-a may be an example of a RedCap device that sometimes may not achieve high throughput of data but does aim to have an efficient energy consumption.

As such, the slot format may define a quantity of time-domain resources, such as symbols (e.g., orthogonal frequency division multiplexing (OFDM) symbols), slots, subframes, or frames that may be used by an uplink channel for uplink communications from the UE 115-a to the base station 105-a and a quantity of non-overlapping time-domain resources that may be used by a downlink channel for downlink communications from the base station 105-a to the UE 115-a. In some cases, slot formats may vary by how many resources are allocated for uplink communications and how many resources are allocated for uplink communications (e.g., a slot format may be associated with a downlink to uplink split, which may be referred to as a D/U split). For example, in some cases, a slot format may include time resources for uplink communications, downlink communications, or a mix of uplink communications and downlink communications. Additionally or alternatively, the slot format may include a number of time-domain resources that are allocated as flexible between uplink and downlink, such that the base station 105-a and the UE 115-a may perform uplink or downlink communications during flexible resources or use the flexible resources to switch from downlink communications to uplink communications. In such examples, a first quantity of time domain resources may be dedicated to uplink communications, a second quantity of time domain resources may be dedicated to downlink communications, and a third quantity of time domain resources may be used for uplink communications or downlink communications.

The slot format may include a time gap (e.g., a tuning gap or a guard period), between resources allocated for downlink communications and resources allocated for uplink communications. Such a time gap may enable the UE 115-a to switch from receiving downlink communications to transmitting uplink communications, or vice versa. For example, the UE 115-a, or a modem of the UE 115-a, may switch the connection of an antenna from a receive chain to a transmit chain during the time gap. In aspects in which the UE 115-a is a reduced capability device, the UE 115-a may reduce complexity and cost by replacing a duplexer (e.g., a duplexer that may be employed by a device supporting full-duplex communications) with a switch that the UE 115-a may use to switch between a downlink carrier (e.g., a downlink channel) and an uplink carrier (e.g., an uplink channel). In other words, the UE 115-a may use the switch to switch from receiving to transmitting, or vice versa. In some aspects, such a switch may be simpler (e.g., less computationally complex) and cost less power than the duplexer that the UE 115-*a* may operate in a full-duplex mode, such as a full-duplex FDD mode. In some cases, the time gap may be defined as a quantity of symbols (e.g., per a specification), a quantity of symbols, a quantity of subframes, a quantity of frames, or a duration of time. In some examples, the time gap may be 100 µs or less for the UE 115-*a* in the case that the UE 115-*a* is operating in a 5G NR system. A corresponding UE 115 using a different random access technology (RAT), such as long term evolution (LTE), may alternatively define the time gap by a number of subframes.

In some cases, the UE 115-*a* may communicate using a half-duplex FDD mode over a set of communication resources assigned to the UE 115-*a*, which may include a carrier bandwidth for uplink communications and a non-overlapping carrier bandwidth for downlink communications. In the case that the wireless communications system 200 is a 5G NR system, a carrier bandwidth that the UE 115-*a* may use for uplink or downlink communications may be different (e.g., relatively wider) than a carrier bandwidth that a UE 115 may use in a different RAT, such as a carrier bandwidth that a UE 115 may use in an LTE system. For example, a UE 115 in an LTE system may use a carrier bandwidth of approximately 1 MHz or 200 kHz, while the UE 115-*a*, operating in a 5G NR system, may use a carrier bandwidth of approximately 20 MHz. Further, the UE 115-*a*, operating in a 5G NR system, may operate using a different (e.g., more flexible) subcarrier spacing (SCS) or numerology than an SCS that a UE 115 may use in a different RAT, such as an SCS that a UE 115 may use in an LTE system. For example, a UE 115 in an LTE system may support a numerology of 15 kHz SCS, while the UE 115-*a*, operating in a 5G NR system, may use numerologies including a 15 kHz SCS, a 30 kHz SCS, or a 60 kHz SCS.

To reduce complexity and increase power savings at the UE 115-*a*, the base station 105-*a* may semi-statically configure the UE 115-*a* with a slot format, which may be referred to herein as a first slot format. In some cases, the base station 105-*a* may semi-statically configure a slot format at the UE 115-*a* based on a reference signal received power (RSRP) report from the UE 115-*a* and the first slot format may include allocations for transmissions and retransmissions in uplink and in downlink based on the RSRP report from the UE 115-*a*. In some cases, the UE 115-*a* may determine one or more monitoring occasions for downlink communications based on the first slot format. For instance, the UE 115-*a* may use the first slot format to determine a resource location in which to monitor for a downlink control channel, such as a physical downlink control channel (PDCCH). As such, the UE 115-*a* may more efficiently decode a PDCCH for downlink transmissions from the base station 105-*a* by monitoring defined resources (e.g., symbol periods) in which a downlink transmission may be received.

In some cases, however, semi-statically configured slot formats may be insufficient to adapt to variations in a traffic pattern or a channel quality between the base station 105-*a* and the UE 115-*a*. For example, in the wireless communications system 200, which may be an example of a 5G NR system, the amount of information that may be transmitted between the base station 105-*a* and the UE 115-*a* may vary over time (and potentially according to relatively short time-scales) and, accordingly, a semi-static configuration of a slot format may be unable to provide an appropriate distribution of resources to meet a current traffic load (e.g., a current data buffer size) between the base station 105-*a* and the UE 115-*a*. For instance, the base station 105-*a* and the UE 115-*a* may occasionally communicate an uplink data burst that may consume a greater number of symbols than the first slot format may allocate for the uplink channel.

Additionally or alternatively, the communication link 205 may be associated with one or more channels that may experience changes in quality on a short time-scale. For instance, the UE 115-*a* may experience changes in a quality of service (QoS) or in a received signal strength more frequently than the base station 105-*a* may configure the UE 115-*a* with a semi-static slot format and, as such, the slot format that the base station 105-*a* and the UE 115-*a* may use for communications may be restricted in its ability to reflect current channel conditions. Additionally or alternatively, the UE 115-*a* may experience a change in cell coverage (e.g., the UE 115-*a* may change location or, in some cases, the geographic coverage area 110-*a* may change size or location) that may influence the amount of information that the base station 105-*a* and the UE 115-*a* may communicate. Accordingly, the change in cell coverage may influence the effectiveness of the first slot format. In other words, a change in cell coverage may adversely impact the ability of the base station 105-*a* and the UE 115-*a* to communicate an amount of information using the first slot format.

In some implementations of the present disclosure, the UE 115-*a* may determine that the first slot format does not efficiently allocate resources for communication between the base station 105-*a* and the UE 115-*a*. The UE 115-*a*, based on determining that the first slot format may be inefficient for current communication demands, may transmit a request to change the slot format 215 in a control message 210 to the base station 105-*a*. The request to change the slot format 215 may include information that the base station 105-*a* may use when determining a slot format (e.g., a second slot format) to configure at the UE 115-*a* for subsequent communications between the base station 105-*a* and the UE 115-*a*. In some examples, the UE 115-*a* may transmit the control message 210 to the base station 105-*a* via Layer 1, Layer 2, or Layer 3 signaling. For example, the control message 210 may be a UCI message, a MAC-CE, or an RRC message.

In some examples, the request to change the slot format 215 may be included in a change of slot format field including information relating to slot format change requests. In some implementations, such a change of slot format field may include an explicit indication of the second slot format. For example, the UE 115-*a* may include an index value in the change of slot format field that corresponds to the second slot format, as described in more detail herein, including with reference to FIG. 3. In some other implementations, the change of slot format field in the UCI message may include a flag that the UE 115-*a* may toggle or adjust to request a different distribution (e.g., a different ratio) of resources between an uplink channel and a downlink channel. For example, the UE 115-*a* may use a number of bits to request the base station 105-*a* to configure a second slot format with more or less resources (e.g., symbols) allocated for uplink communications or downlink communications or, in some cases, for flexible communications, as described in more detail herein, including with reference to FIG. 3. In some examples, a first flag value may be used to request additional time resources for uplink communications (as compared to the current format), a second flag value may be used to request additional time resources for downlink communications (as compared to the current format), a third flag value may be used to request additional time resources for allocated to be flexible for either uplink communications or downlink communications (as compared to the current format), a fourth flag value may be used to request a default slot format, or other flag values may be used to request different variations of uplink and downlink allocations. In some examples, any combination of flag values may be configured for use by a wireless communications system.

Alternatively, in some other implementations, the UE 115-*a* may include the request to change the slot format 215 in a scheduling request in the control message (e.g., in the UCI message, the MAC-CE, or the RRC message). For example, the request to change the slot format 215 in the scheduling request may include a number of bits that indicate an amount of additional time or frequency resources that the UE 115-*a* may use for uplink communications (e.g., for an uplink data burst), as described in more detail herein, including with reference to FIG. 3. In some other implementations the UE 115-*a* may include the request to change the slot format 215 in a C-BSR in the control message (e.g., in the UCI message, the MAC-CE, or the RRC message). The C-BSR may be a quantized or a reduced size BSR including a number of bits that may include the request to change the slot format 215, as described in more detail herein, including with reference to FIG. 3.

In some examples, the UE 115-*a* may transmit the request to change the slot format 215 in the UCI message on an uplink control channel, such as a physical uplink control channel (PUCCH) and may be multiplex the request to change the slot format 215 with other fields in the UCI message. For instance, the UE 115-*a* may transmit a HARQ feedback field and a CSI report field, among other fields that the UE 115-*a* may include in UCI, to the base station 105-*a* via the UCI message over the PUCCH. Accordingly, in such examples, the UE 115-*a* may multiplex the request to change the slot format 215 (e.g., in a change of slot format field) with the HARQ feedback field or the CSI report field, or both. Further, in cases in which the UE 115-*a* includes the request to change the slot format 215 in a scheduling request or a C-BSR, the UE 115-*a* may multiplex the scheduling request or the C-BSR with the HARQ feedback field, the CSI report field, the change of slot format field, or any combination thereof.

Alternatively, the UE 115-*a* may transmit the UCI message including the request to change the slot format 215 on an uplink shared channel, such as a physical uplink shared channel (PUSCH). For example, the UE 115-*a* may multiplex the UCI message with a PUSCH transmission on a number of RRC configured uplink resources (e.g., slots or symbols). In such examples, the UCI message may be referred to as a piggybacked UCI. The UE 115-*a* may transmit the UCI message on the PUSCH if a transmission over the PUCCH collides with a transmission over the PUSCH. In such examples, the UE 115-*a* may transmit the request to change the slot format 215 in a field (e.g., in a change of slot format field) of the UCI message and, in some examples, may multiplex the request to change the slot format 215 with a HARQ feedback field or a CSI report field, or both. Further, in cases in which the UE 115-*a* includes the request to change the slot format 215 in a scheduling request or a C-BSR, the UE 115-*a* may multiplex the scheduling request or the C-BSR with the HARQ feedback field, the CSI report field, the change of slot format field, or any combination thereof. In some cases, the UE 115-*a* may refrain from including additional fields other than a HARQ feedback field, a CSI report field, a change of slot format field, and one or both of a scheduling request or a C-BSR in a piggybacked UCI.

In cases in which the UE 115-*a* transmits the request to change the slot format 215 in a MAC-CE (e.g., via layer 2 signaling), the UE 115-*a* may map the MAC-CE including the request to change the slot format 215 to the PUSCH. In cases in which the UE 115-*a* transmits the request to change the slot format 215 in an RRC message (e.g., via layer 3 signaling), the UE 115-*a* may map the RRC message to the PUSCH.

Regardless of the type of control message 210 (e.g., UCI, MAC-CE, or RRC) or the type of field within the control message 210 that the UE 115-*a* uses to convey the request to change the slot format 215, the request to change the slot format 215 may request the base station 105-*a* to configure the UE 115-*a* with a second slot format that may enable more optimal communications between the base station 105-*a* and the UE 115-*a* based on the current traffic pattern of the system, the quality of the communication link 205, the size of the geographic coverage area 110-*a*, or any combination thereof. Accordingly, the base station 105-*a* may receive the request to change the slot format 215 and determine to configure the second slot format at the UE 115-*a* for subsequent communications.

The base station 105-*a* may transmit an indication of the second slot format to the UE 115-*a*. In some examples, the base station 105-*a* may signal the indication of the second slot format via a slot format indicator field in downlink control information (DCI). In some examples, the UE 115-*a* may maintain a table of supported slot formats in a memory stored at the UE 115-*a* and, in such examples, the slot format indicator field may include an index value corresponding to the second slot format in the table stored at the UE 115-*a*. In some cases, the table stored at the UE 115-*a* may be referred to as a lookup table (LUT). Accordingly, the UE 115-*a* may receive the indication of the second slot format and use the second slot format for subsequent communications between the base station 105-*a* and the UE 115-*a*.

As such, the base station 105-*a* and the UE 115-*a* may communicate information based on the second slot format. In some aspects, the UE 115-*a* may request additional resources for the uplink channel for an uplink data burst and, upon receiving the indication of the second slot format, may transmit the uplink data burst to the base station 105-*a* using the resources allocated for the uplink channel in the second slot format. Upon completion of communicating the uplink data burst to the base station 105-*a*, the UE 115-*a* may determine that the second slot format includes more symbols for the uplink channel than are necessary based on a current amount of information to be transmitted or on a current quality associated with the communication link 205, or both. As such, the UE 115-*a* may transmit a second request to change the slot format 215 in another control message 210 to the base station 105-*a*. In some examples, the second request may include similar information to the first request, such as an explicit indication of a slot format or a toggled flag in a change of slot format field, an indication of an amount of resources in a scheduling request, or a request in a C-BSR.

In some other examples, the second request to change the slot format 215 may be a request to change the slot format used by the base station 105-*a* and the UE 115-*a* from the second slot format to a default slot format of the UE 115-*a*. For example, upon establishment of an RRC connection between the base station 105-*a* and the UE 115-*a*, the base station 105-*a* may configure (e.g., RRC configure, such as via dedicated RRC signaling) the default slot format at the UE 115-*a*. In some aspects, the default slot format configured at the UE 115-*a* may be associated with a format more likely to provide power savings to the UE 115-*a* than other slot formats and, accordingly, the UE 115-*a* may achieve greater power savings by switching back to a default slot format.

Figure 3:
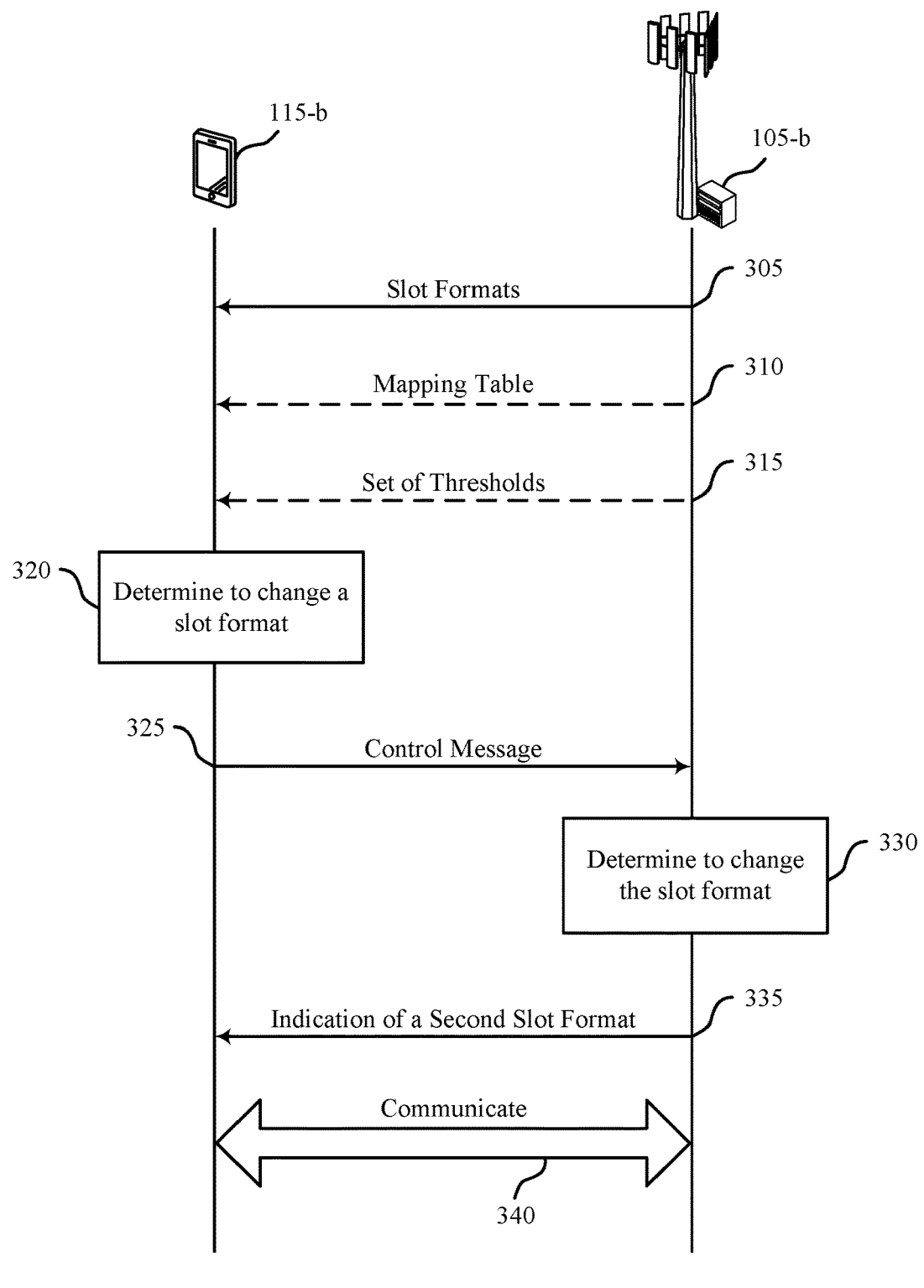
FIG. 3 illustrates an example of a process flow that supports signaling to adjust slot format in accordance with aspects of the present disclosure.

FIG. 3 illustrates an example of a process flow 300 that supports signaling to adjust slot format in accordance with aspects of the present disclosure. In some examples, the process flow 300 may implement aspects of the wireless communications system 100 or the wireless communications system 200. For example, the process flow 300 may illustrate communications between a base station 105-*b* and a UE 115-*b*, which may be examples of corresponding devices as described herein, including with reference to FIGS. 1 and 2. In some examples, the UE 115-*b* may transmit, to the base station 105-*b*, a control message (e.g., a UCI message, via a MAC-CE, or via an RRC message) including a request to change the slot format.

In some examples, the base station 105-*b* and the UE 115-*b* may establish a connection (e.g., an RRC connection) and the base station 105-*b* may configure the UE 115-*b* with a default slot format (e.g., via dedicated RRC signaling). The base station 105-*b* and the UE 115-*b* may communicate information using the default slot format, which may include a first number of resources (e.g., a first number of symbols) that are allocated for uplink communication using an uplink channel and a second number of resources (e.g., a second number of symbols) that are allocated for downlink communication using a downlink channel. Further, in some cases, the default slot format may include a third number of resources (e.g., a third number of symbols) that are allocated as flexible. In some aspects, the base station 105-*a* and the UE 115-*a* may use the third number of resources that are allocated as flexible to maintain a tuning gap (e.g., a switching gap, a time gap, or a guard period) between the first number of resources and the second number of resources. For instance, the UE 115-*b* (e.g., a reduced capability device) may communicate with the base station 105-*b* using a half-duplex mode (e.g., HD-FDD mode) and, as such, the first number of resources allocated for uplink communications and the second number of resources allocated for downlink communications may be non-overlapping.

The base station 105-*b* and the UE 115-*b* may support a quantity of slot formats in addition to the default slot format. In some examples, the UE 115-*b* may determine the quantity of supported slot formats based on signaling from the base station 105-*b*. At 305, for example, the base station 105-*b* may transmit, to the UE 115-*b*, a set of slot formats supported by the base station 105-*b*, the set of slot formats including at least a first slot format and a second slot format. In some examples, the base station 105-*b* may transmit the set of supported slot formats to the UE 115-*b* via system information. In some implementations, the set of slot formats may be pre-defined, such as by a specification. For instance, the set of slot formats may be hard-coded in a specification and the base station 105-*b* may transmit system information including the set of slot formats based on the specification. In some other implementations, the set of slot formats may be configured (e.g., dynamically configured) by the network and the base station 105-*b* may signal the set of slot formats in system information based on the network configuration.

In some other examples, the base station 105-*b* may arrange the set of slot formats in a table and may transmit (e.g., broadcast) one or more indices corresponding to the slot formats that are supported by the base station 105-*b*. As such, the base station 105-*b* may configure a slot format at the UE 115-*b* by transmitting the one or more indices to the UE 115-*b*, which may enable the base station 105-*b* to avoid transmitting a bitmap associated with the set of supported slot formats each time the UE 115-*b* requests a slot format change. In such examples, the base station 105-*b* and the UE 115-*b* may reduce the signaling overhead associated with providing the set of supported slot formats to the UE 115-*b*.

In some aspects, the base station 105-*b* may support multiple uplink component carriers or multiple downlink component carriers, or both. In other words, the base station 105-*b* may support carrier aggregation. In cases in which the base station 105-*b* supports multiple uplink component carriers or multiple downlink component carriers, or both, slot formats may include slot format configurations that vary across different component carrier pairs (e.g., combinations of an uplink component carrier and a downlink component carrier). For instance, each unique component carrier pair may be associated with one or more unique slot formats. As such, the base station 105-*b* may determine the component carrier pair that is supported by the UE 115-*b* (e.g., the UE 115-*b* may support a single component carrier pair) and may determine the set of slot formats based on the component carrier pair supported by the UE 115-*b*. In some cases, the base station 105-*b* may configure the UE 115-*b* with a component carrier pair and may thus configure the UE 115-*b* with one or more slot formats based on the configured component carrier pair. Alternatively, the set of slot formats may include slot format configurations that are the same across different component carrier pairs. As such, the set of slot formats may include slot formats that apply regardless of the unique component carrier pair supported by the UE 115-*b*.

Additionally or alternatively, the base station 105-*b* may transmit a set of supported slot formats based on the interference patterns in the wireless communications system. For example, the base station 105-*b* may communicate with one or more other devices that are capable of wirelessly transmitting or receiving in the wireless communications system prior to transmitting the set of supported slot formats to the UE 115-*b* and determine areas (e.g., time and frequency locations) of potential interference that may adversely affect communications between the base station 105-*b* and the UE 115-*b*. For instance, the base station 105-*b* may look to one or more neighboring base stations 105 and determine areas of potential interference. Accordingly, the base station 105-*b* may configure the UE 115-*b* with a set of supported slot formats, which may be one or more slot formats, that account for the determined areas of potential interference. For example, the base station 105-*b* may transmit an indication of a set of supported slot formats that avoid using the time and frequency locations that the base station 105-*b* determined as areas of potential interference.

At 310, the base station 105-*b* may, in some implementations, transmit a mapping table to the UE 115-*b*. In some examples, the mapping table may include a mapping between the buffered data size and the BSR (e.g., the C-BSR). The UE 115-*b* may use the mapping table to generate the C-BSR, which may include the request to change the slot format in some implementations. For example, the base station 105-*b* may inform the UE 115-*b*, via the mapping table, how to indicate the amount of information that the UE 115-*b* may transmit to the base station 105-*b* in the request to change the slot format.

For instance, the UE 115-*b* may determine, based on the mapping table, that if the UE 115-*b* has a first amount of information to transmit to the base station 105-*b* (e.g., 100 bytes of uplink data), the UE 115-*b* may transmit a first bit value (e.g., 00) to the base station 105-*b* in the request to change the slot format. Similarly, if the UE 115-*b* determines that the UE 115-*b* has a second amount of information to transmit to the base station 105-*b* (e.g., 200 bytes of uplink data), the UE 115-*b* may transmit a second bit value (e.g., 01) to the base station 105-*b* in the request to change the slot format. Likewise, the UE 115-*b* may determine to transmit a third bit value if the UE 115-*b* has a third amount of information to transmit to the base station 105-*b*, and so on.

At 315, the base station 105-*b* may, in some implementations, transmit a set of thresholds to the UE 115-*b*. In some examples, the set of thresholds may include a threshold associated with a payload size of the control message (e.g., the UCI message, the MAC-CE, or the RRC message), the BSR (e.g., the C-BSR), or the buffered data size. The UE 115-*b* may use the set of thresholds to generate the C-BSR, which may include the request to change the slot format in some implementations. For example, the amounts of information (e.g., the buffered data size, such as 100 bytes or 200 bytes) that the UE 115-*b* may transmit to the base station 105-*b* may correspond to different thresholds of the set of thresholds. As such, the UE 115-*b* may determine to transmit, in the request to change the slot format, a first bit value if the UE 115-*b* has a first amount of information or less, a second bit value if the UE 115-*b* has between the first amount of information and a second amount of information, a third bit value if the UE 115-*b* has between the second amount of information and a third amount of information, and so on.

In implementations in which the UE 115-*b* uses the C-BSR to convey the request to change the slot format to the base station 105-*b*, the base station 105-*b* may transmit one or both of the mapping table and the set of thresholds. Likewise, the UE 115-*b* may use one or both of the mapping table and the set of thresholds to generate the C-BSR including the request to change the slot format. In some other implementations, such as those in which the UE 115-*b* transmits the request to change the slot format in the change of slot format field or the scheduling request, the base station 105-*b* may refrain from transmitting the mapping table and the set of thresholds.

At 320, the UE 115-*b* may determine to change the slot format used by the communication resources including the uplink channel (e.g., the uplink component carrier) and the downlink channel (e.g., the downlink component carrier). In some examples, the UE 115-*a* may determine that a current slot format, which may be referred to as the first slot format, is sub-optimal based on an amount of information to be transmitted or a channel quality, or both, as described in more detail herein, including with reference to FIG. 2. For example, the UE 115-*b* may identify that a pending or forthcoming uplink data burst may occupy a greater number of symbol periods than the first slot format allocates to the uplink channel and, as such, the UE 115-*b* may determine to change the slot format prior to communicating the uplink data burst with the base station 105-*b*.

At 325, the UE 115-*b* may transmit, to the base station 105-*b*, a control message that includes the request to change the slot format used by the communication resources based on determining to change the slot format. The UE 115-*b* may transmit the request to the base station 105-*b* in a variety of ways. For example, the UE 115-*b* may transmit the request to change the slot format via Layer 1, Layer 2, or Layer 3 signaling. For instance, the UE 115-*b* may transmit the request to change the slot format in a UCI message (e.g., via UCI), in a MAC-CE, or in an RRC message. Further, the UE 115-*b* may convey the request to change the slot format in a variety of ways within the control message. The control message may be an example of a UCI message, a MAC-CE, or an RRC message, in some cases. Additionally, the UE 115-*b* may multiplex the request to change the slot format with other fields of the control message as described in more detail herein, including with reference to FIG. 2. In some aspects, the UE 115-*b* may transmit the control message including the request to change the slot format as assistance information for the base station 105-*b* and, as such, the control message may be an example of UE assistance information.

Further, in some examples, the UE 115-*b* may determine a timer for receiving an indication of the second slot format from the base station 105-*b* (e.g., the resource allocation associated with the second slot format) based on transmitting the request to change the slot format. In such examples, the UE 115-*b* may start the timer for receiving the indication of the second slot format based on transmitting the request to change the slot format to the base station 105-*b*. As such, the UE 115-*b* may expect to receive the indication of the second slot format prior to an expiration of the timer. Regardless of the technique employed, the UE 115-*b* may transmit the request to change the slot format to the base station 105-*b* according to the first slot format.

In some examples, the UE 115-*b* may select the second slot format from the set of supported slot formats for communicating the amount of information to be transmitted and may transmit, to the base station 105-*b*, an explicit indication of the second slot format. For example, the UE 115-*b* may decode the supported slot formats transmitted to the UE 115-*b* by the base station 105-*b* at 305 and the UE 115-*b* may arrange the supported slot formats in a table (e.g., a LUT) stored in a memory at the UE 115-*b*. The UE 115-*b* may determine an index value corresponding to the second slot format based on the table of supported slot formats and may transmit the index value to the base station 105-*a* in the request to change the slot format. In some cases, a number of bits that the UE 115-*b* uses to signal the index value may be correlated with the size of the table in the memory stored at the UE 115-*b*, and the UE 115-*b* may include the index value in the request to change the slot format if the payload of the control message is sufficiently large to carry the explicit indication.

Additionally or alternatively, the request to change the slot format may include a flag (e.g., a sub-field) that the UE 115-*b* may toggle or adjust to request the base station 105-*b* to configure a second slot format with a different distribution between uplink time resources, downlink time resources, and flexible time resources. For example, the UE 115-*b* may determine to change the resource allocation for the uplink channel or the downlink channel or to change the time duration (e.g., the number of symbols) allocated as flexible symbols and may transmit a bit stream (e.g., a sequence of a number of bits) to indicate the determination of the UE 115-*b* to the base station 105-*b*. For instance, the UE 115-*b* may employ four bits and may toggle the flag to request a more uplink-centric slot format (e.g., a slot format including a greater resource allocation for the uplink channel) by setting the flag to a first bit value (e.g., 11), may toggle the flag to request a more downlink-centric slot format (e.g., a slot format including a greater resource allocation for the downlink channel) by setting the flag to a second bit value (e.g., 00), or may trigger configuration of a default slot format (e.g., the RRC configured or semi-statically configured slot format) by setting the flag to a third bit value (e.g., 01). Similarly, the UE 115-*b* may toggle a more flexible-centric slot format (e.g., a slot format including a greater number of flexible symbols) by setting the flag to a fourth value (e.g., 10). In some implementations, the UE 115-*b* may progressively toggle the slot format in a number of consecutive control messages that are sent to the base station 105-*b*.

Additionally or alternatively, the UE 115-*b* may include the request to change the slot format in a scheduling request in the control message (e.g., in the UCI message, the MAC-CE, or the RRC message). For example, the UE 115-*b* may generate a scheduling request including a number of bits N 1. The number of bits N may indicate an amount of additional resources (e.g., time or frequency resources) that the UE 115-*b* may use for the information to be transmitted to the base station 105-*b*. For example, the UE 115-*b* may determine that a pending or forthcoming uplink data burst may use a number of symbol periods in addition to what the first slot format allocates for the uplink channel and the UE 115-*b* may use the number of bits N to indicate, to the base station 105-*b*, the additional number of symbol periods that the second slot format may include. As such, the UE 115-*b* may transmit the scheduling request including the number of bits N to the base station 105-*b*. In some implementations, the UE 115-*b* may include an indication for the base station 105-*b* to maintain the first slot format (e.g., refrain from configuring a new slot format) in the scheduling request. In some examples, the UE 115-*b* may transmit such an indication to maintain the first slot format based on a bandwidth constraint of the UE 115-*b*.

Additionally or alternatively, the UE 115-*b* may include the request to change the slot format in a C-BSR in the control message (e.g., in the UCI message, the MAC-CE, or the RRC message). For example, the UE 115-*b* may generate the C-BSR including a number of bits M≥1, where the number of bits M may indicate the request to change the slot format to the base station 105-*b*. In some aspects, the C-BSR, which may be mapped to a PUCCH in UCI, may have a reduced size as compared to a BSR (e.g., a full-size BSR) that is mapped to a PUSCH and transmitted in a MAC-CE. Moreover, the UE 115-*b* may refrain from padding and byte-aligning the C-BSR, which may be different than what the UE 115-*b* may do when mapping the full-size BSR to the PUSCH in a MAC-CE. In some implementations, the UE 115-*b* may generate the C-BSR based on the mapping table received at 310 or the set of thresholds received at 315, or both.

At 330, the base station 105-*b* may determine to change the slot format used by the communication resources. The base station 105-*b* may determine to change the slot format based on receiving the request to change the slot format in the control message from the UE 115-*b* at 325 and may select a new slot format (e.g., the second slot format) based on the information provided by the UE 115-*b* in the request to change the slot format. In some examples, the base station 105-*b* may receive an explicit indication of the second slot format and, as such, may determine to change the slot format to the second slot format. For example, the base station 105-*b* may receive an index value in the request transmitted by the UE 115-*b* and the base station 105-*b* may determine to change to the second slot format based on determining that the second slot format corresponds to the index value in a table stored at the base station 105-*b* (e.g., a LUT). In implementations in which the set of slot formats that are supported by the base station 105-*b* vary across component carriers, the base station 105-*b* may store multiple tables and may determine which table the index value corresponds to based on the component carrier pair used by the UE 115-*b*. In implementations in which the set of slot formats that are supported by the base station 105-*b* are the same across component carriers, the base station 105-*b* may store a single table that the base station 105-*b* may use regardless of the component carrier pair used by the UE 115-*b*.

Additionally or alternatively, the base station 105-*b* may identify a flag in the request to change the slot format that may request the base station 105-*b* to change the distribution of resources (e.g., time-domain resources) in the second slot format relative to the first slot format. In some examples, the base station 105-*b* may receive a flag indicating that the UE 115-*b* will transmit an uplink data burst that may use a greater number of symbols than the first slot format allocates for the uplink channel and, as such, the base station 105-*b* may select a slot format from the set of supported slot formats that has a greater number of symbols allocated to the uplink channel than the first slot format. In some aspects, the base station 105-*b* may identify that several slot formats of the set of support slot formats satisfy the request from the UE 115-*b*. In such aspects, the base station 105-*b* may select any of the satisfactory slot formats (e.g., may select randomly), select a slot format that has a minimum number of symbols allocated to the uplink channel that satisfies the request, or select a slot format associated with a potential for power savings at the UE 115-*b*. Further, in some examples, the base station 105-*b* may communicate with other base stations 105 or UEs 115 and determine areas of potential interference in the system and may select a slot format that is least likely to be influenced by the interference.

Additionally or alternatively, the base station 105-*b* may receive a scheduling request including the request to change the slot format and may determine to change the slot format based on the information included in the scheduling report. For example, the base station 105-*b* may identify that the UE 115-*b* will transmit an uplink data burst that may use a number of additional symbols in excess of what the first slot format allocates for the uplink channel and the base station 105-*b* may determine to change the slot format to a slot format that allocates (e.g., or approximately allocates) the number of additional symbols to the uplink channel. Additionally or alternatively, the base station 105-*b* may receive a C-BSR including the request to change the slot format and the base station 105-*b* may determine to change the slot format based on the information in the C-BSR. For example, the base station 105-*b* may determine an amount of information to be transmitted to the base station 105-*b* from the UE 115-*b* based on a bit value included in the C-BSR and may determine to change the slot format based on the amount of information to be transmitted.

At 335, the base station 105-*b* may transmit, to the UE 115-*b*, an indication of the second slot format for communicating the information (e.g., the uplink data burst) over the communication resources. The base station 105-*b* may transmit the indication of the second slot format based on determining to change the slot format at 330. In some examples, the base station 105-*b* may transmit the indication of the second slot format in DCI including an index into a memory stored at the UE 115-*b*, the index into the memory corresponding to the second slot format. For example, the base station 105-*b* may convey the indication of the second slot format in a slot format indicator field in DCI and the slot format indicator field may include the index that corresponds to the second slot format based on a table stored in the memory at the UE 115-*b*.

At 340, the UE 115-*b* may communicate, with the base station 105-*b*, the information (e.g., the uplink data burst) over the communication resources using the second slot format. The base station 105-*b* and the UE 115-*b* may continue to communicate using the second slot format until the UE 115-*b* transits another request to change the slot format to the base station 105-*b* or until the base station 105-*b* provides another RRC configured slot format (e.g., a semi-statically configured slot format, which may function as a default slot format). In some examples, upon completion of communicating the information to the base station 105-*b*, the UE 115-*b* may transmit another request to change the slot format to the base station 105-*b* requesting the base station 105-*b* to re-configure the UE 115-*a* with the first slot format, configure a different slot format (e.g., a third slot format), or configure the default slot format based on a most recent traffic pattern or channel quality.

Figure 4:
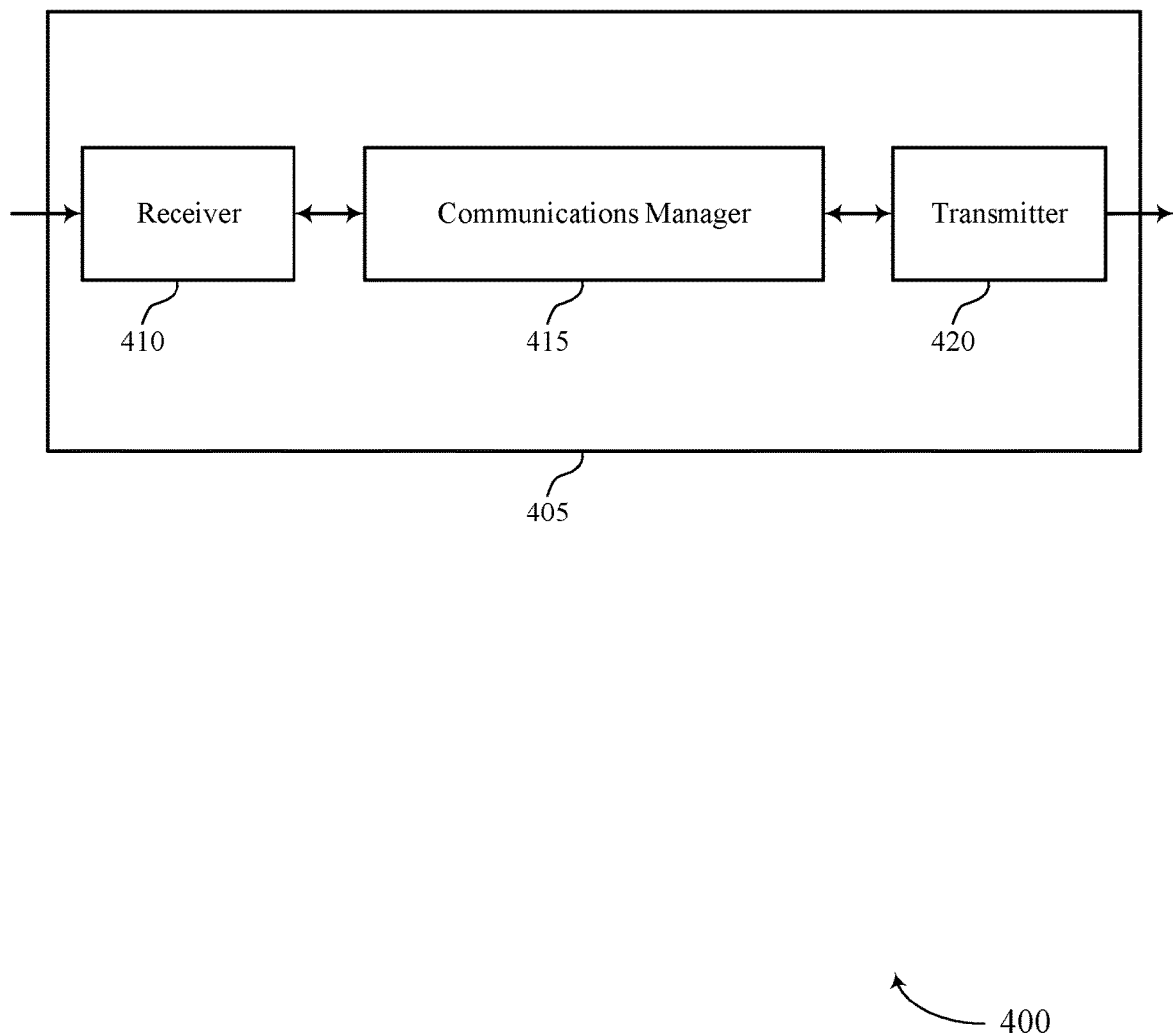
FIGS. 4 and 5 show block diagrams of devices that support signaling to adjust slot format in accordance with aspects of the present disclosure.

FIG. 4 shows a block diagram 400 of a device 405 that supports signaling to adjust slot format in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to signaling to adjust slot format). Information may be passed on to other components of the device 405. The receiver 410 may be an example of aspects of the transceiver 720 described with reference to FIG. 7. The receiver 410 may utilize a single antenna or a set of antennas.

The communications manager 415 may determine to change a slot format used by communication resources including an uplink channel and a downlink channel, the communication resources operating in a half-duplex mode using a first slot format, receive, from the base station, an indication of a second slot format for communicating information over the communication resources based on transmitting the request, transmit, to a base station, a control message that includes a request to change the slot format used by the communication resources based on determining to change the slot format, and communicate, with the base station, the information over the communication resources using the second slot format based on receiving the indication. The communications manager 415 may be an example of aspects of the communications manager 710 described herein.

The communications manager 415, or its sub-components, may be implemented in hardware, software (e.g., executed by a processor), or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

In some examples, the communications manager 415 may be implemented as an integrated circuit or chipset for a mobile device modem, and the receiver 410 and the transmitter 420 may be implemented as analog components (e.g., amplifiers, filters, antennas) coupled with the mobile device modem to enable wireless transmission and reception over one or more bands.

The communications manager 415 as described herein may be implemented to realize one or more potential advantages. In some implementations of the present disclosure, the communications manager 415 may achieve a good balance between complexity reduction, power saving, and scheduling flexibility. For example, based on dynamically requesting a change in slot format from a base station 105, the device 405 may more optimally communicate with the base station 105, which may potentially improve the spectral efficiency of the device 405 and decrease the number of slots over which the device 405 may communicate. Accordingly, the device 405 may spend longer durations in a sleep mode, which may enhance power savings and improve battery life.

In some examples, the device 405 may be a reduced capability device and, as such, may communicate using a half-duplex FDD mode to reduce complexity and improve power savings. By implementing the described techniques to dynamically request a slot format change, the device 405 may preserve the benefits of operating in a half-duplex FDD mode while enhancing the benefits associated with greater scheduling flexibility, such as increased system throughput and enhanced spectral efficiency.

Figure 5:
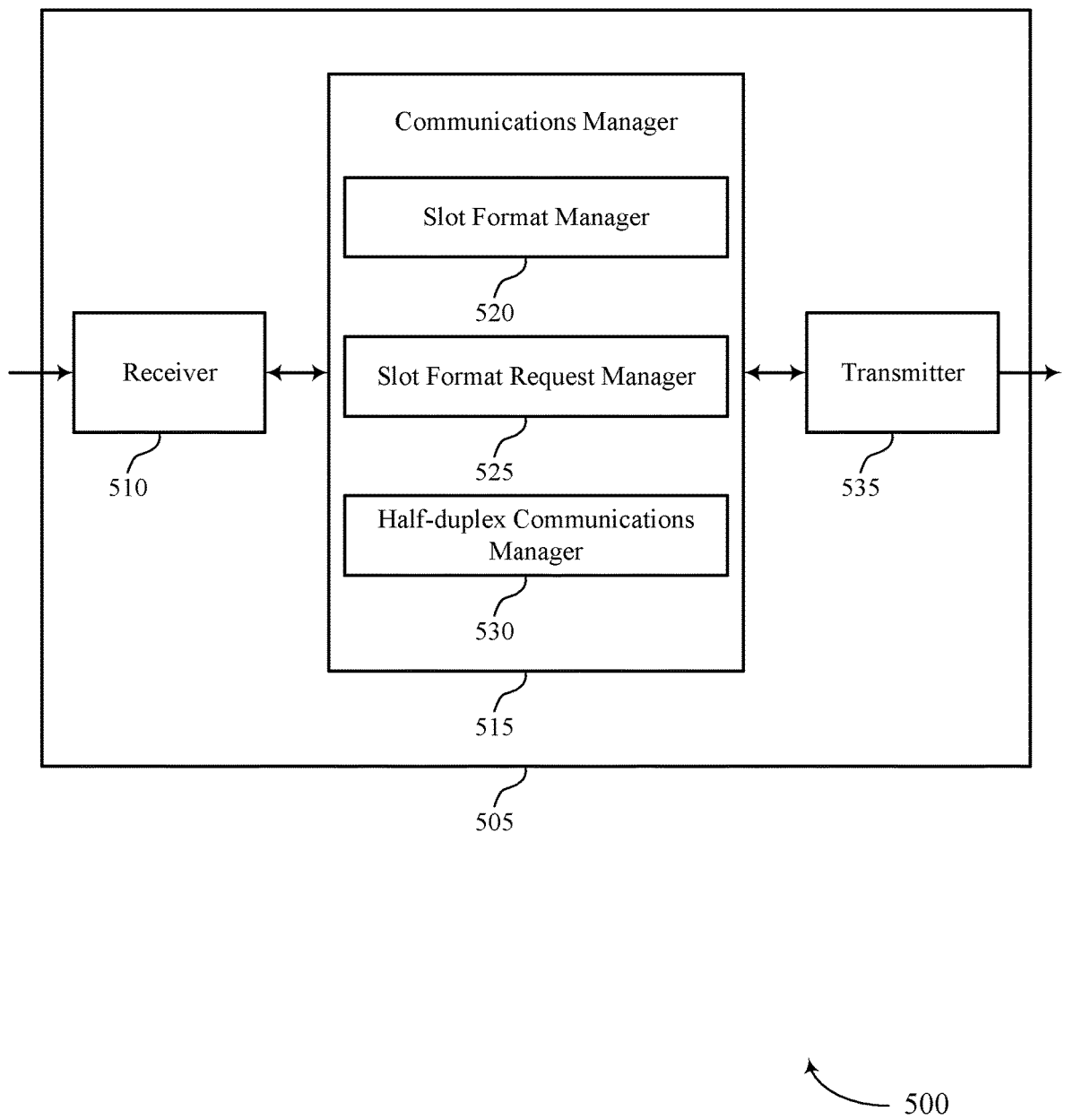

FIG. 5 shows a block diagram 500 of a device 505 that supports signaling to adjust slot format in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to signaling to adjust slot format). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a slot format manager 520, a slot format request manager 525, and a half-duplex communications manager 530. The communications manager 515 may be an example of aspects of the communications manager 710 described herein.

The slot format manager 520 may determine to change a slot format used by communication resources including an uplink channel and a downlink channel, the communication resources operating in a half-duplex mode using a first slot format and receive, from the base station, an indication of a second slot format for communicating information over the communication resources based on transmitting the request.

The slot format request manager 525 may transmit, to a base station, a control message that includes a request to change the slot format used by the communication resources based on determining to change the slot format.

The half-duplex communications manager 530 may communicate, with the base station, the information over the communication resources using the second slot format based on receiving the indication.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
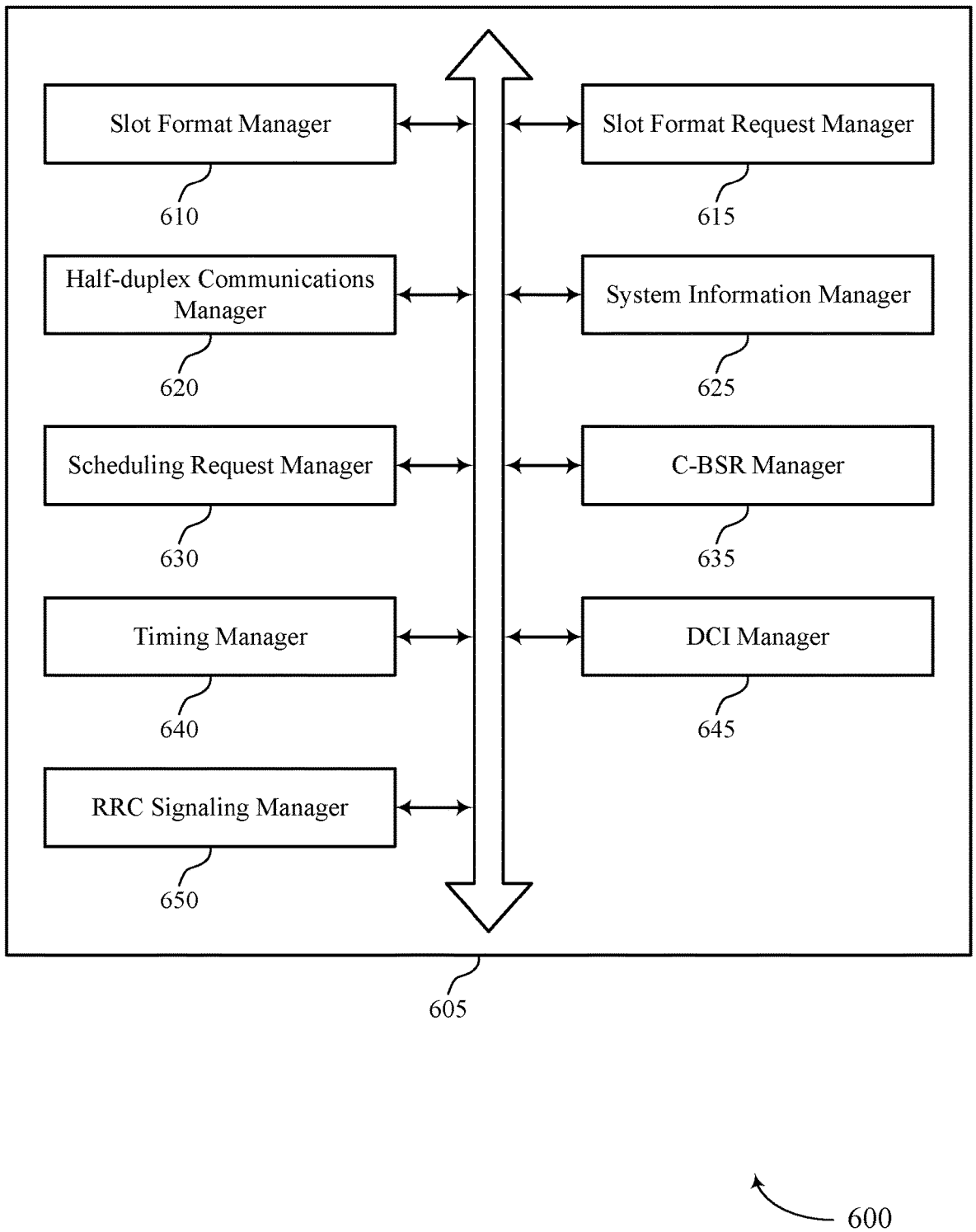
FIG. 6 shows a block diagram of a communications manager that supports signaling to adjust slot format in accordance with aspects of the present disclosure.

FIG. 6 shows a block diagram 600 of a communications manager 605 that supports signaling to adjust slot format in accordance with aspects of the present disclosure. The communications manager 605 may be an example of aspects of a communications manager 415, a communications manager 515, or a communications manager 710 described herein. The communications manager 605 may include a slot format manager 610, a slot format request manager 615, a half-duplex communications manager 620, a system information manager 625, a scheduling request manager 630, a C-BSR manager 635, a timing manager 640, a DCI manager 645, and an RRC signaling manager 650. Each of these components may communicate, directly or indirectly, with one another (e.g., via one or more buses).

The slot format manager 610 may determine to change a slot format used by communication resources including an uplink channel and a downlink channel, the communication resources operating in a half-duplex mode using a first slot format. In some examples, the slot format manager 610 may receive, from the base station, an indication of a second slot format for communicating information over the communication resources based on transmitting the request. In some examples, the slot format manager may select the second slot format for communicating the information over the communication resources, where transmitting the control message is based on selecting the second slot format, where the request to change the slot format used by the communication resources includes the second slot format.

In some examples, the slot format manager 610 may determine an index value corresponding to the second slot format selected by the UE, where the request to change the slot format used by the communication resources includes the index value. In some examples, the slot format manager 610 may determine, by the UE, to change a resource allocation for the uplink channel, to change a resource allocation for the downlink channel, to change a time duration spanned by a number of flexible symbols, or any combination thereof. In some examples, the slot format manager 610 may select a flag to include in the control message based on determining to change the resource allocation for the uplink channel, to change the resource allocation for the downlink channel, or to change the time duration spanned by the number of flexible symbols, or any combination thereof, where transmitting the control message is based on selecting the flag.

In some examples, the slot format manager 610 may select a first flag value based on determining to change the resource allocation for the uplink channel. In some examples, the slot format manager 610 may select a second flag value based on determining to change the resource allocation for the downlink channel. In some examples, the slot format manager 610 may select a third flag value based on determining to change the time duration spanned by the number of flexible symbols.

In some examples, the slot format manager 610 may determine a quantity of resources for the uplink channel, where the request to change the slot format used by the communication resources includes the quantity of resources for the uplink channel and a timer to receive the indication of the second slot format or a second resource allocation. In some examples, the slot format manager 610 may determine to change the slot format used by the communication resources is based on an amount of the information or a channel quality, or both. In some cases, the flag indicates changing a ratio of a first set of time-domain resources allocated to the uplink channel and a second set of time-domain resources allocated to the downlink channel, and where a value of the flag is associated with one or more slot formats.

The slot format request manager 615 may transmit, to a base station, a control message that includes a request to change the slot format used by the communication resources based on determining to change the slot format. In some examples, the slot format request manager may transmit, to the base station, a flag in the control message to change a resource allocation for the uplink channel, to change a resource allocation for the downlink channel, or to change a time duration spanned by a number of flexible symbols, or any combination thereof, where the request to change the slot format used by the communication resources includes the includes the flag.

In some examples, the slot format request manager 615 may transmit, to the base station, a second control message that includes a second request to change the slot format used by the communication resources to a default slot format based on a completion of communicating the information over the communication resources using the second slot format. In some cases, the control message includes a UCI message, a MAC-CE, or an RRC message. In some cases, the request to change the slot format used by the communication resources is multiplexed with one or more other fields in the control message. In some cases, the request to change the slot format is transmitted using the first slot format.

The half-duplex communications manager 620 may communicate, with the base station, the information over the communication resources using the second slot format based on receiving the indication. In some cases, the half-duplex mode of the communication resources includes a half-duplex FDD mode.

The system information manager 625 may receive, from the base station, system information that includes a set of slot formats supported by the base station, the set of slot formats including the first slot format and the second slot format, where determining to change the slot format is based on receiving the set of slot formats, and where determining the index value corresponding to the second slot format is based on receiving the set of slot formats. In some examples, the system information manager 625 may receive, from the base station, system information that includes a set of slot formats supported by the base station, the set of slot formats including the first slot format and the second slot format, where determining to change the slot format is based on receiving the system information that includes the set of slot formats.

The scheduling request manager 630 may generate a scheduling request including the request to change the slot format used by the communication resources, where the control message transmitted by the UE includes the scheduling request.

The C-BSR manager 635 may generate a BSR that includes the request to change the slot format used by the communication resources, where the control message transmitted by the UE includes the BSR. In some examples, the C-BSR manager 635 may receive, from the base station, a mapping table associated with a mapping between an amount of the information in a data buffer and an indication in the BSR, where generating the BSR is based on the mapping table.

In some examples, the C-BSR manager 635 may receive, from the base station, a set of thresholds associated with a payload size of the control message, the BSR, an amount of the information in a data buffer, or any combination thereof, where generating the BSR is based on the set of thresholds. In some cases, the BSR includes a quantized or compressed BSR in an uplink control channel relative to a second BSR in an uplink shared channel.

The timing manager 640 may generate a timer to indicate a duration associated with receiving the indication of the second slot format, where the control message includes the timer. In some examples, the timing manager 640 may determine a timer associated with receiving the indication of the second slot format, where the timer corresponds to a duration during which the UE may receive the indication of the second slot format, where transmitting the request to change the slot format is based on determining the timer associated with receiving the indication of the second slot format.

The DCI manager 645 may receive, from the base station, DCI that includes the indication of the second slot format, where the indication of the second slot format is an index into a memory at the UE corresponding to the second slot format.

The RRC signaling manager 650 may establish an RRC connection with a base station. In some cases, the indication of a slot format (e.g., a default slot format) is received via RRC signaling.

Figure 7:
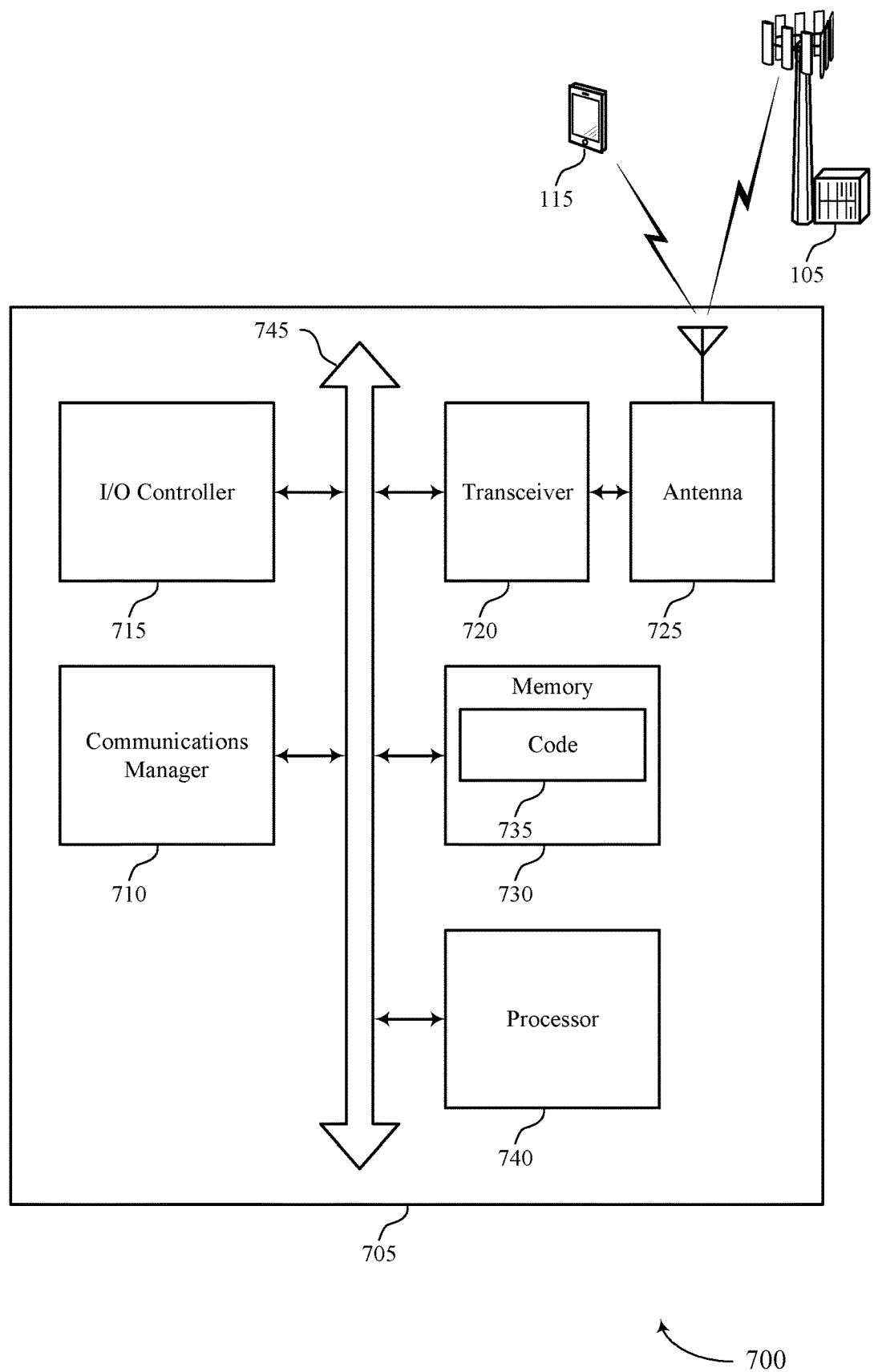
FIG. 7 shows a diagram of a system including a device that supports signaling to adjust slot format in accordance with aspects of the present disclosure.

FIG. 7 shows a diagram of a system 700 including a device 705 that supports signaling to adjust slot format in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be coupled (e.g., operatively, communicatively, functionally, electronically, or electrically) via one or more buses (e.g., bus 745).

The communications manager 710 may determine to change a slot format used by communication resources including an uplink channel and a downlink channel, the communication resources operating in a half-duplex mode using a first slot format, receive, from the base station, an indication of a second slot format for communicating information over the communication resources based on transmitting the request, transmit, to a base station, a control message that includes a request to change the slot format used by the communication resources based on determining to change the slot format, and communicate, with the base station, the information over the communication resources using the second slot format based on receiving the indication.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting signaling to adjust slot format).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
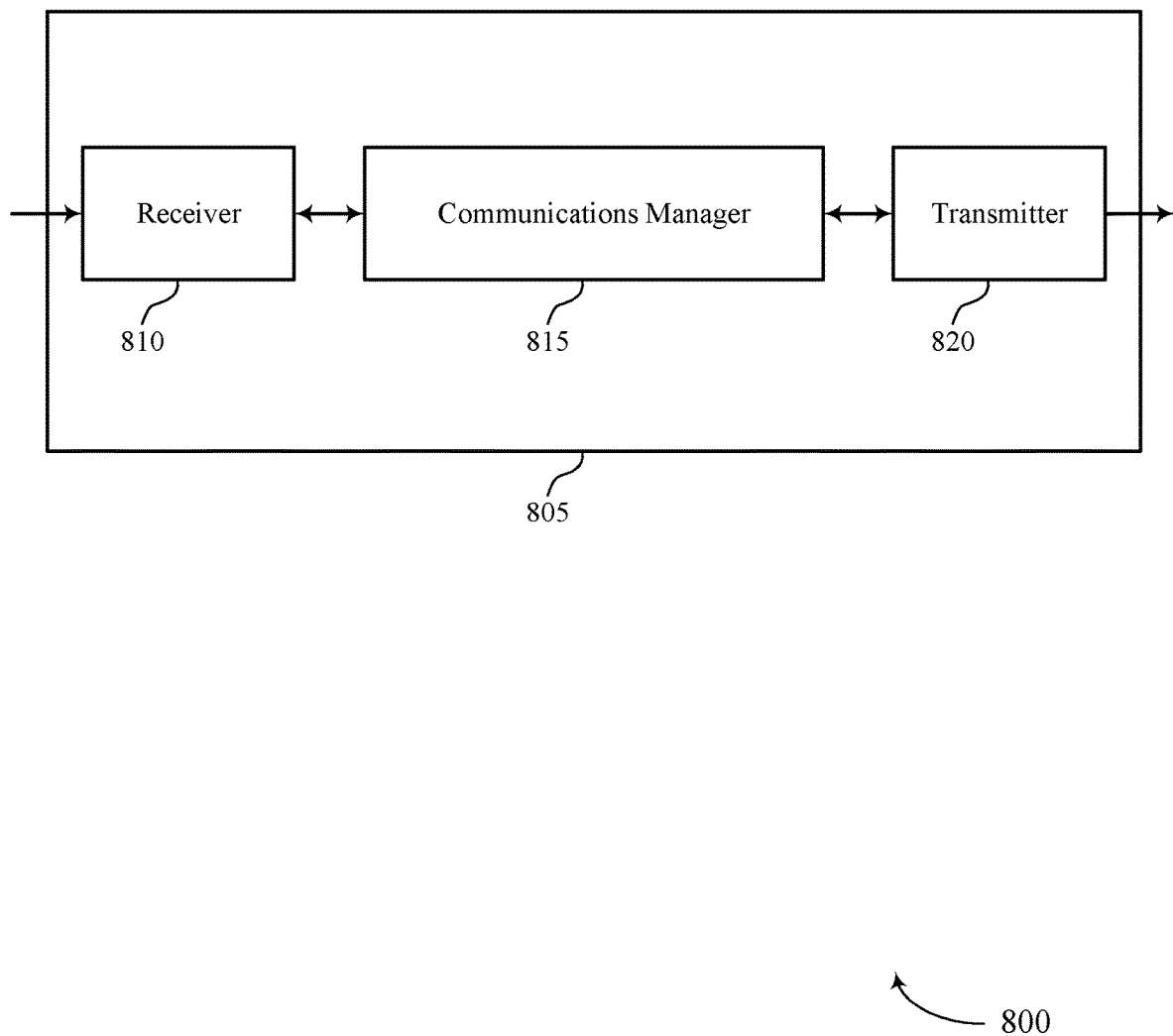
FIGS. 8 and 9 show block diagrams of devices that support signaling to adjust slot format in accordance with aspects of the present disclosure.

FIG. 8 shows a block diagram 800 of a device 805 that supports signaling to adjust slot format in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to signaling to adjust slot format). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a UE, a control message that includes a request to change a slot format used by communication resources including an uplink channel and a downlink channel, determine to change the slot format used by the communication resources based on receiving the request, the communication resources operating in a half-duplex mode using a first slot format, transmit, to the UE, an indication of a second slot format for communicating information over the communication resources based on determining to change the slot format used by the communication resources, and communicate, with the UE, the information over the communication resources using the second slot format based on transmitting the indication. The communications manager 815 may be an example of aspects of the communications manager 1110 described herein.

The communications manager 815, or its sub-components, may be implemented in hardware, software (e.g., executed by a processor), or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

As described herein, the device 805 may receive dynamic requests to change the slot format used by communication resources between a UE 115 and the device 805. Likewise, the device 805 may dynamically configure the UE 115 with more optimal slot formats based on a current traffic pattern or channel quality, which may enable the UE 115 and the device 805 to more efficiently communicate information, which may increase system throughput and spectral efficiency.

Moreover, the described techniques may enable the device 805 to reduce the amount of signaling overhead associated with changes in slot formats, which may reduce system interference and increase the likelihood for successful communications at the device 805. As such, the device 805 may increase the likelihood of performing fewer retransmissions or monitoring fewer monitoring occasions, which may reduce the power cost of one or more components of the device 805.

Figure 9:
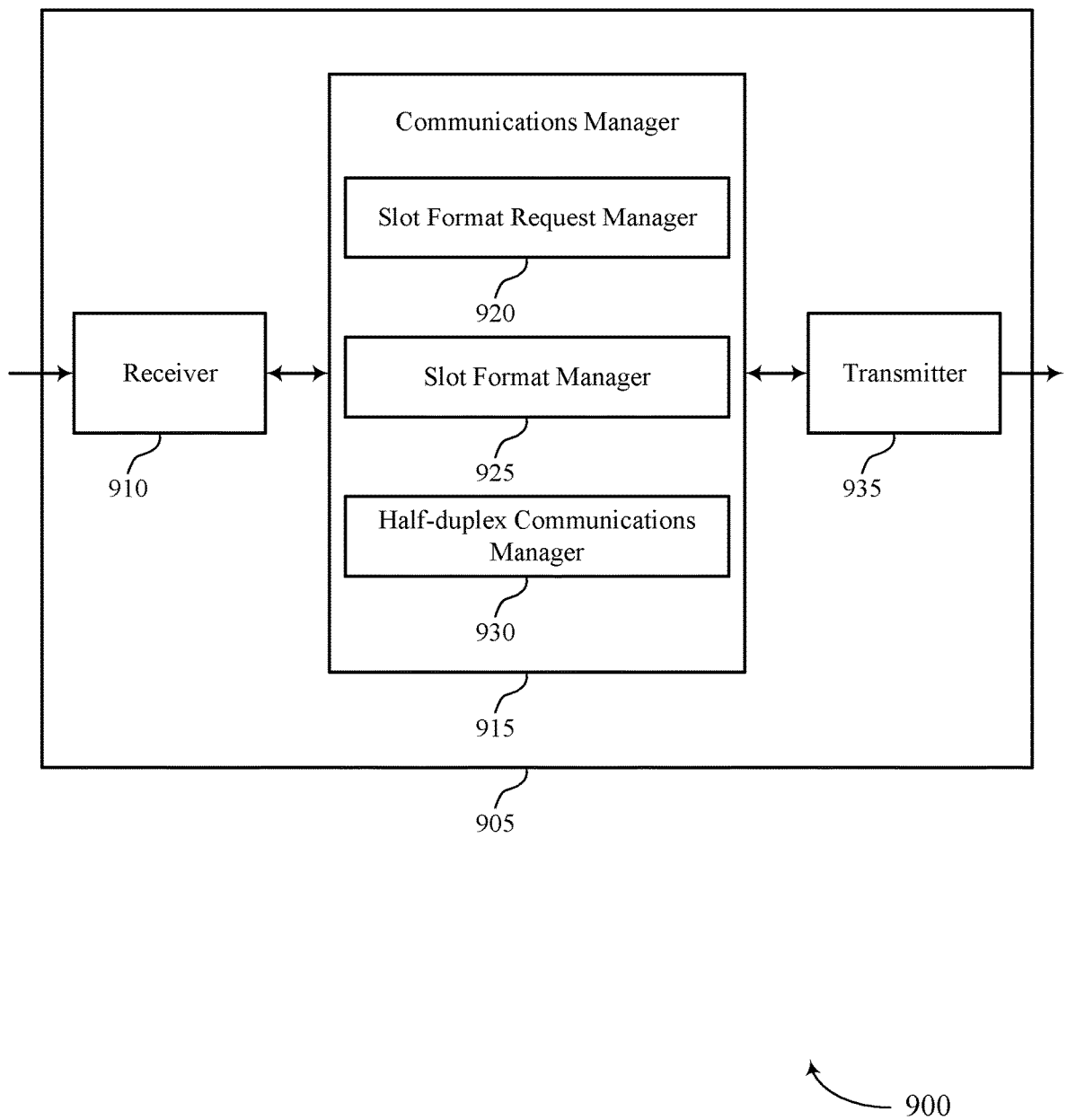

FIG. 9 shows a block diagram 900 of a device 905 that supports signaling to adjust slot format in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to signaling to adjust slot format). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a slot format request manager 920, a slot format manager 925, and a half-duplex communications manager 930. The communications manager 915 may be an example of aspects of the communications manager 1110 described herein.

The slot format request manager 920 may receive, from a UE, a control message that includes a request to change a slot format used by communication resources including an uplink channel and a downlink channel.

The slot format manager 925 may determine to change the slot format used by the communication resources based on receiving the request, the communication resources operating in a half-duplex mode using a first slot format and transmit, to the UE, an indication of a second slot format for communicating information over the communication resources based on determining to change the slot format used by the communication resources.

The half-duplex communications manager 930 may communicate, with the UE, the information over the communication resources using the second slot format based on transmitting the indication.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
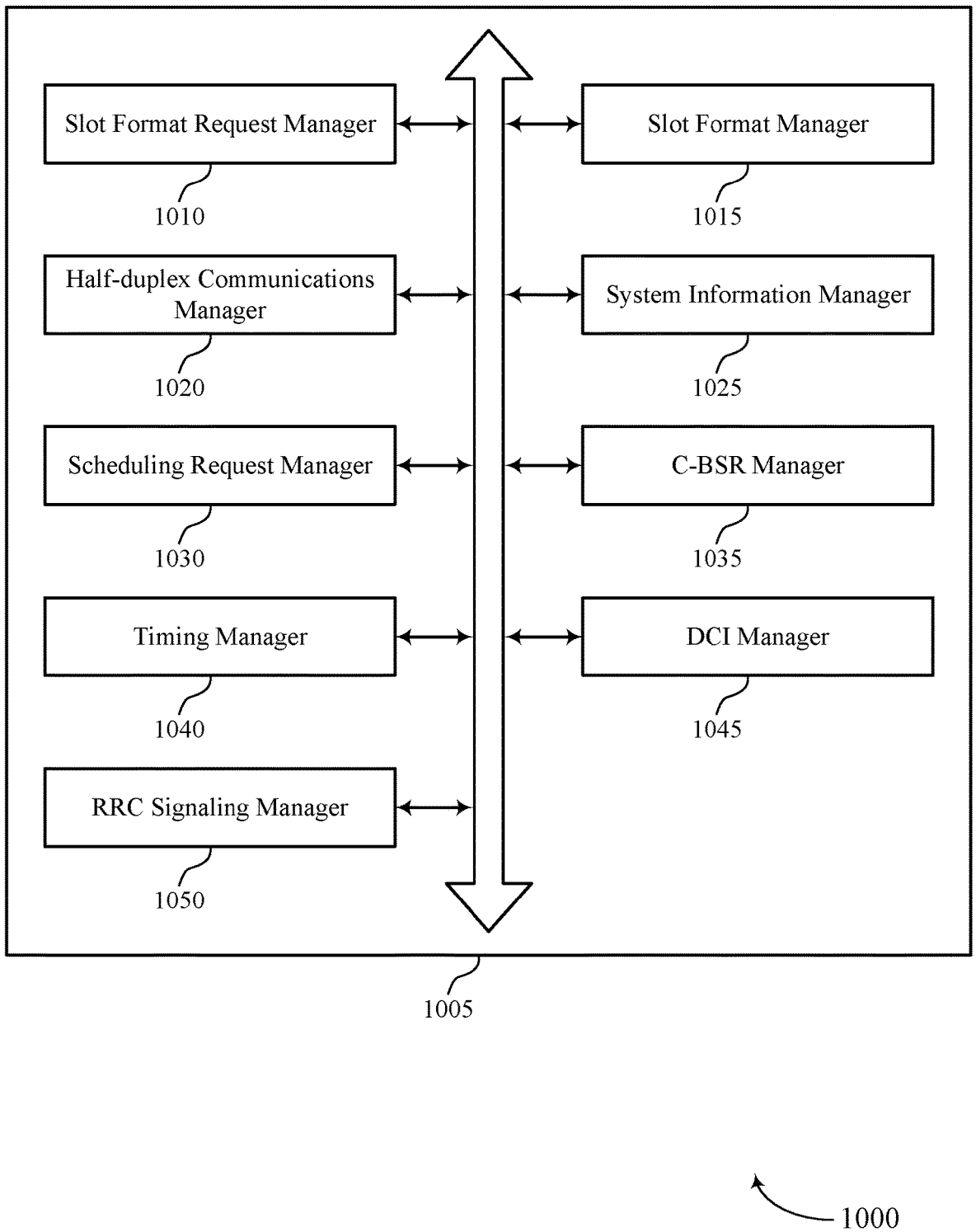
FIG. 10 shows a block diagram of a communications manager that supports signaling to adjust slot format in accordance with aspects of the present disclosure.

FIG. 10 shows a block diagram 1000 of a communications manager 1005 that supports signaling to adjust slot format in accordance with aspects of the present disclosure. The communications manager 1005 may be an example of aspects of a communications manager 815, a communications manager 915, or a communications manager 1110 described herein. The communications manager 1005 may include a slot format request manager 1010, a slot format manager 1015, a half-duplex communications manager 1020, a system information manager 1025, a scheduling request manager 1030, a C-BSR manager 1035, a timing manager 1040, a DCI manager 1045, and an RRC signaling manager 1050. Each of these components may communicate, directly or indirectly, with one another (e.g., via one or more buses).

The slot format request manager 1010 may receive, from a UE, a control message that includes a request to change a slot format used by communication resources including an uplink channel and a downlink channel. In some examples, the slot format request manager 1010 may receive, from the UE, a flag in the control message to change a resource allocation for the uplink channel, to change a resource allocation for the downlink channel, to change a time duration spanned by a number of flexible symbols, or any combination thereof, where the request to change the slot format used by the communication resources includes the flag.

In some examples, the slot format request manager 1010 may receive, from the UE, a second control message that includes a second request to change the slot format used by the communication resources to a default slot format based on a completion of communicating the information over the communication resources using the second slot format.

In some cases, the control message includes a UCI message, a MAC-CE, or an RRC message. In some cases, the request to change the slot format used by the communication resources is multiplexed with one or more other fields in the control message. In some cases, the request to change the slot format is received using the first slot format.

The slot format manager 1015 may determine to change the slot format used by the communication resources based on receiving the request, the communication resources operating in a half-duplex mode using a first slot format. In some examples, the slot format manager 1015 may transmit, to the UE, an indication of a second slot format for communicating information over the communication resources based on determining to change the slot format used by the communication resources.

In some examples, the slot format manager 1015 may identify, by the base station, the second slot format for communicating the information over the communication resources based on the request including the second slot format, where transmitting the indication of the second slot format is based on identifying the second slot format. In some examples, the slot format manager 1015 may determine an index value corresponding to the second slot format, where identifying the second slot format is based on determining the index value, where the request to change the slot format used by the communication resources includes the index value. In some cases, the flag indicates changing a ratio of a first set of time-domain resources allocated to the uplink channel and a second set of time-domain resources allocated to the downlink channel.

The half-duplex communications manager 1020 may communicate, with the UE, the information over the communication resources using the second slot format based on transmitting the indication. In some cases, the half-duplex mode of the communication resources includes a half-duplex FDD mode.

The system information manager 1025 may transmit, to the UE, system information that includes a set of slot formats supported by the base station, the set of slot formats including the first slot format and the second slot format, where determining the index value corresponding to the second slot format is based on the set of slot formats. In some examples, the system information manager 1025 may transmit, to the UE, system information that includes a set of slot formats supported by the base station, the set of slot formats including the first slot format and the second slot format, where determining to change the slot format is based on transmitting the system information that includes the set of slot formats.

The scheduling request manager 1030 may receive, from the UE, a scheduling request that includes the request to change the slot format used by the communication resources, where the control message received from the UE includes the scheduling request, where determining to change the slot format is based on receiving the scheduling request. In some examples, the scheduling request manager 1030 may determine a quantity of resources for the uplink channel, where the request to change the slot format used by the communication resources includes the quantity of resources for the uplink channel and a timer to receive the indication of the second slot format or a second resource allocation.

The C-BSR manager 1035 may receive, from the UE, a BSR that includes the request to change the slot format used by the communication resources, where the control message received from the UE includes the BSR. In some examples, the C-BSR manager 1035 may transmit, to the UE, a mapping table associated with a mapping between an amount of the information in a data buffer and an indication in the BSR, where the BSR is based on the mapping table.

In some examples, the C-BSR manager 1035 may transmit, to the UE, a set of thresholds associated with a payload size of the control message, the BSR, an amount of the information in a data buffer, or any combination thereof, where the BSR is based on the set of thresholds. In some cases, the BSR includes a quantized or compressed BSR in an uplink control channel relative to a second BSR in an uplink shared channel.

The timing manager 1040 may generate a timer to indicate a duration associated with transmitting the indication of the second slot format, where the control message includes the timer. In some examples, the timing manager 1040 may determine a timer associated with transmitting the indication of the second slot format, where the timer corresponds to a duration during which the base station may transmit the indication of the second slot format, where receiving the request to change the slot format is based on determining the timer associated with transmitting the indication of the second slot format.

The DCI manager 1045 may transmit, to the UE, DCI that includes the indication of the second slot format, where the indication of the second slot format is an index into a memory at the UE corresponding to the second slot format.

The RRC signaling manager 1050 may establish an RRC connection with the UE.

In some cases, the indication of a slot format (e.g., a default slot format) is received via RRC signaling.

Figure 11:
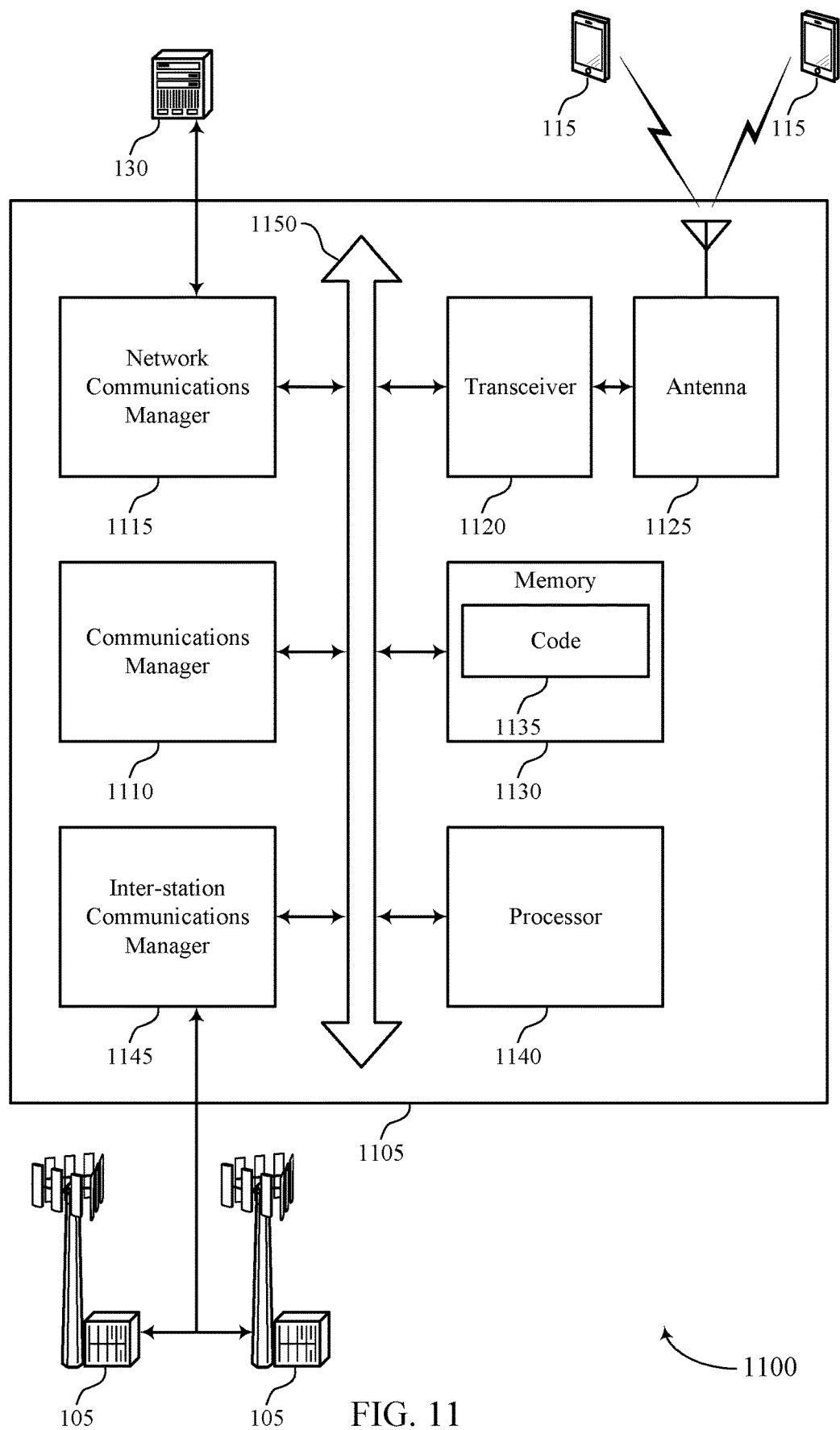
FIG. 11 shows a diagram of a system including a device that supports signaling to adjust slot format in accordance with aspects of the present disclosure.

FIG. 11 shows a diagram of a system 1100 including a device 1105 that supports signaling to adjust slot format in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be coupled (e.g., operatively, communicatively, functionally, electronically, or electrically) via one or more buses (e.g., bus 1150).

The communications manager 1110 may receive, from a UE, a control message that includes a request to change a slot format used by communication resources including an uplink channel and a downlink channel, determine to change the slot format used by the communication resources based on receiving the request, the communication resources operating in a half-duplex mode using a first slot format, transmit, to the UE, an indication of a second slot format for communicating information over the communication resources based on determining to change the slot format used by the communication resources, and communicate, with the UE, the information over the communication resources using the second slot format based on transmitting the indication.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting signaling to adjust slot format).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
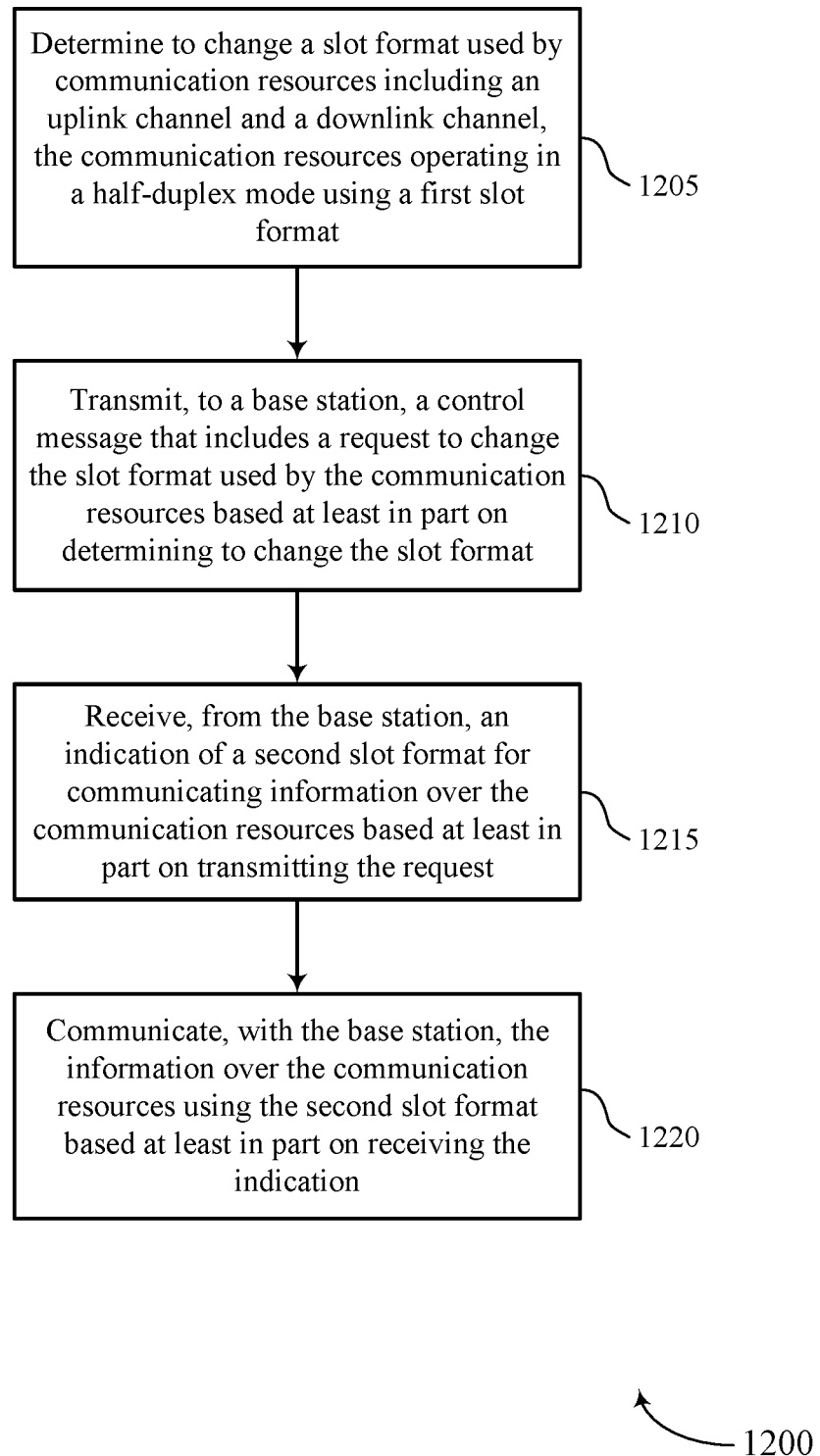
FIGS. 12 through 23 show flowcharts illustrating methods that support signaling to adjust slot format in accordance with aspects of the present disclosure.

FIG. 12 shows a flowchart illustrating a method 1200 that supports signaling to adjust slot format in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may determine to change a slot format used by communication resources including an uplink channel and a downlink channel, the communication resources operating in a half-duplex mode using a first slot format. The operations of 1205 may be performed according to the methods described herein. In some examples, aspects of the operations of 1205 may be performed by a slot format manager as described with reference to FIGS. 4 through 7.

At 1210, the UE may transmit, to a base station, a control message that includes a request to change the slot format used by the communication resources based at least in part on determining to change the slot format. The operations of 1210 may be performed according to the methods described herein. In some examples, aspects of the operations of 1210 may be performed by a slot format request manager as described with reference to FIGS. 4 through 7.

At 1215, the UE may receive, from the base station, an indication of a second slot format for communicating information over the communication resources based at least in part on transmitting the request. The operations of 1215 may be performed according to the methods described herein. In some examples, aspects of the operations of 1215 may be performed by a slot format manager as described with reference to FIGS. 4 through 7.

At 1220, the UE may communicate, with the base station, the information over the communication resources using the second slot format based at least in part on receiving the indication. The operations of 1220 may be performed according to the methods described herein. In some examples, aspects of the operations of 1220 may be performed by a half-duplex communications manager as described with reference to FIGS. 4 through 7.

Figure 13:
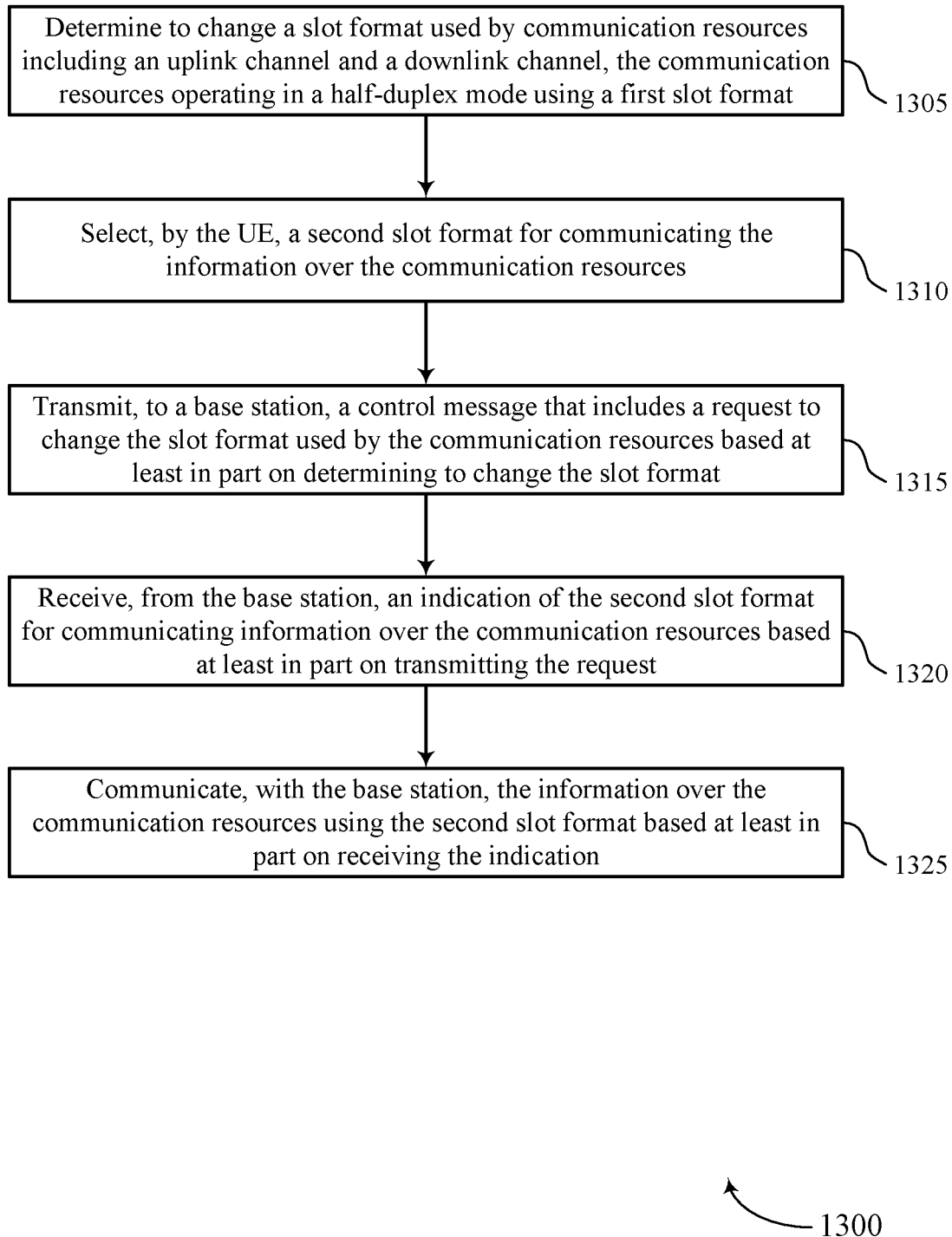

FIG. 13 shows a flowchart illustrating a method 1300 that supports signaling to adjust slot format in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may determine to change a slot format used by communication resources including an uplink channel and a downlink channel, the communication resources operating in a half-duplex mode using a first slot format. The operations of 1305 may be performed according to the methods described herein. In some examples, aspects of the operations of 1305 may be performed by a slot format manager as described with reference to FIGS. 4 through 7.

At 1310, the UE may select, by the UE, a second slot format for communicating the information over the communication resources. The operations of 1310 may be performed according to the methods described herein. In some examples, aspects of the operations of 1310 may be performed by a slot format manager as described with reference to FIGS. 4 through 7.

At 1315, the UE may transmit, to a base station, a control message that includes a request to change the slot format used by the communication resources based at least in part on determining to change the slot format. In some examples, the request to change the slot format may include the selected second slot format. The operations of 1315 may be performed according to the methods described herein. In some examples, aspects of the operations of 1315 may be performed by a slot format request manager as described with reference to FIGS. 4 through 7.

At 1320, the UE may receive, from the base station, an indication of the second slot format for communicating information over the communication resources based at least in part on transmitting the request. The operations of 1320 may be performed according to the methods described herein. In some examples, aspects of the operations of 1320 may be performed by a slot format manager as described with reference to FIGS. 4 through 7.

At 1325, the UE may communicate, with the base station, the information over the communication resources using the second slot format based at least in part on receiving the indication. The operations of 1325 may be performed according to the methods described herein. In some examples, aspects of the operations of 1325 may be performed by a half-duplex communications manager as described with reference to FIGS. 4 through 7.

Figure 14:
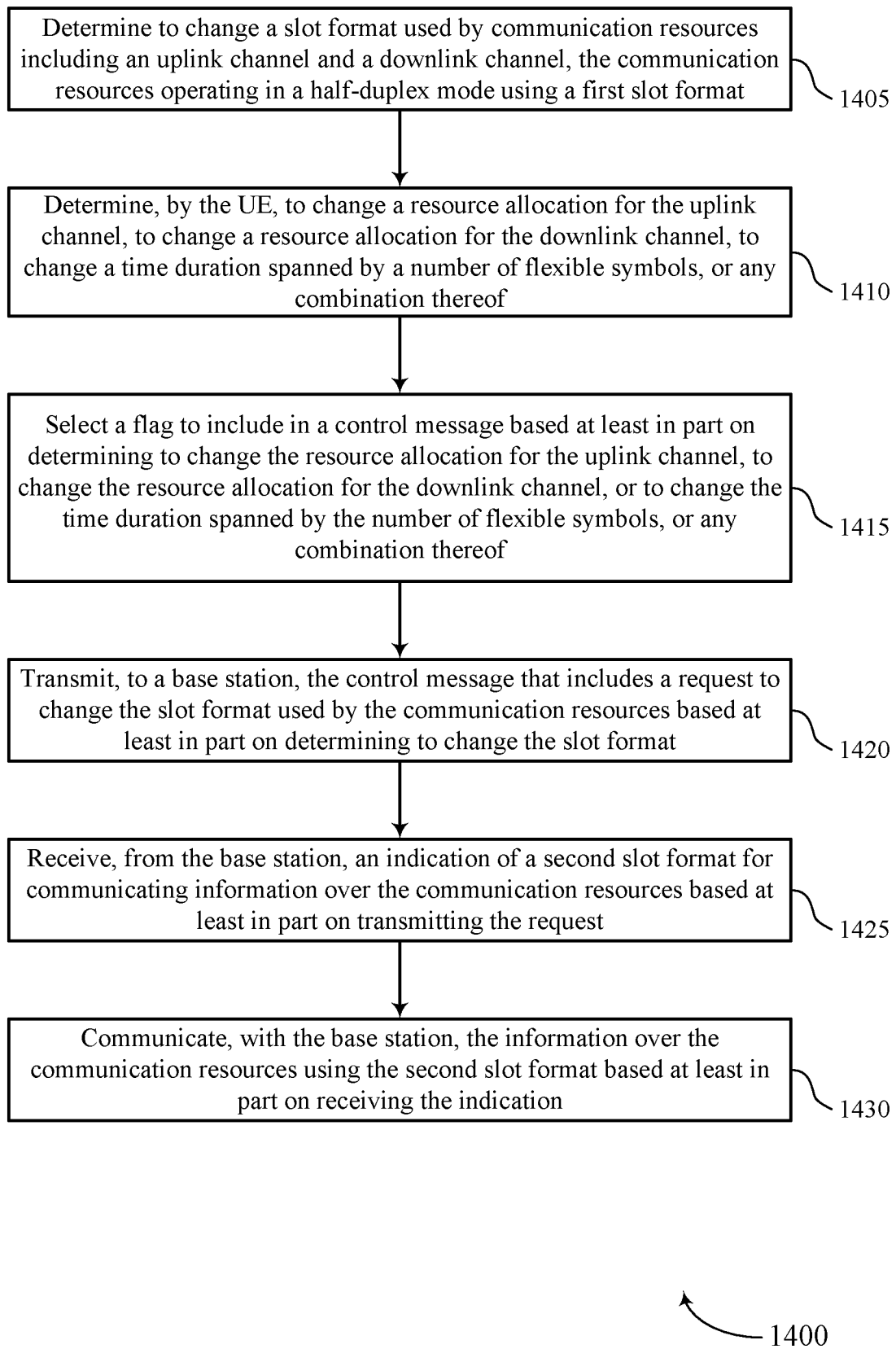

FIG. 14 shows a flowchart illustrating a method 1400 that supports signaling to adjust slot format in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may determine to change a slot format used by communication resources including an uplink channel and a downlink channel, the communication resources operating in a half-duplex mode using a first slot format. The operations of 1405 may be performed according to the methods described herein. In some examples, aspects of the operations of 1405 may be performed by a slot format manager as described with reference to FIGS. 4 through 7.

At 1410, the UE may determine, by the UE, to change a resource allocation for the uplink channel, to change a resource allocation for the downlink channel, to change a time duration spanned by a number of flexible symbols, or any combination thereof. The operations of 1410 may be performed according to the methods described herein. In some examples, aspects of the operations of 1410 may be performed by a slot format manager as described with reference to FIGS. 4 through 7.

At 1415, the UE may select a flag to include in a control message based at least in part on determining to change the resource allocation for the uplink channel, to change the resource allocation for the downlink channel, or to change the time duration spanned by the number of flexible symbols, or any combination thereof. The operations of 1415 may be performed according to the methods described herein. In some examples, aspects of the operations of 1415 may be performed by a slot format manager as described with reference to FIGS. 4 through 7.

At 1420, the UE may transmit, to a base station, the control message that includes a request to change the slot format used by the communication resources based at least in part on determining to change the slot format. In some examples, transmitting the control message is based on selecting the flag. The operations of 1420 may be performed according to the methods described herein. In some examples, aspects of the operations of 1420 may be performed by a slot format request manager as described with reference to FIGS. 4 through 7.

At 1425, the UE may receive, from the base station, an indication of a second slot format for communicating information over the communication resources based at least in part on transmitting the request. The operations of 1425 may be performed according to the methods described herein. In some examples, aspects of the operations of 1425 may be performed by a slot format manager as described with reference to FIGS. 4 through 7.

At 1430, the UE may communicate, with the base station, the information over the communication resources using the second slot format based at least in part on receiving the indication. The operations of 1430 may be performed according to the methods described herein. In some examples, aspects of the operations of 1430 may be performed by a half-duplex communications manager as described with reference to FIGS. 4 through 7.

Figure 15:
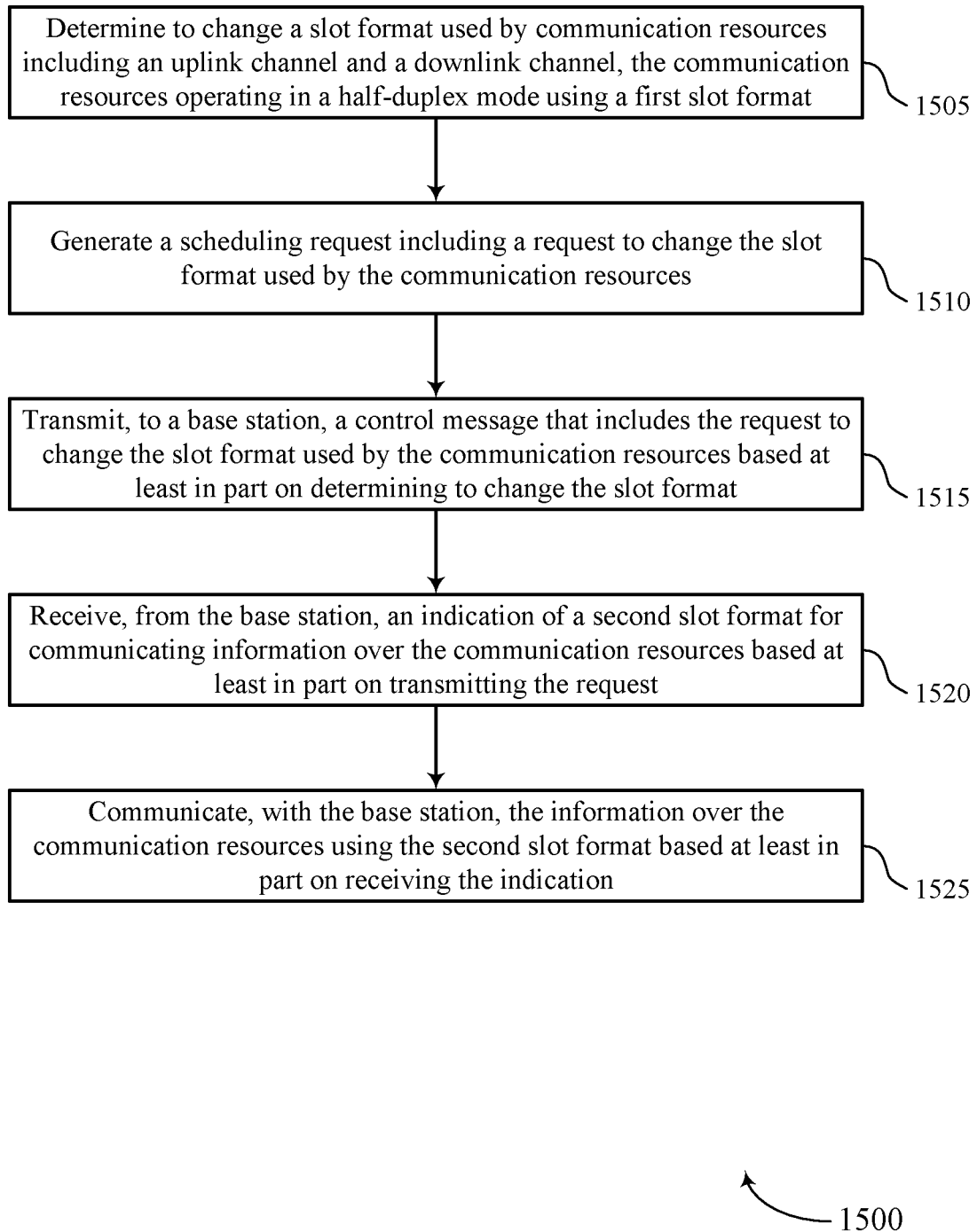

FIG. 15 shows a flowchart illustrating a method 1500 that supports signaling to adjust slot format in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may determine to change a slot format used by communication resources including an uplink channel and a downlink channel, the communication resources operating in a half-duplex mode using a first slot format. The operations of 1505 may be performed according to the methods described herein. In some examples, aspects of the operations of 1505 may be performed by a slot format manager as described with reference to FIGS. 4 through 7.

At 1510, the UE may generate a scheduling request including a request to change the slot format used by the communication resources. The operations of 1510 may be performed according to the methods described herein. In some examples, aspects of the operations of 1510 may be performed by a scheduling request manager as described with reference to FIGS. 4 through 7.

At 1515, the UE may transmit, to a base station, a control message that includes the request to change the slot format used by the communication resources based at least in part on determining to change the slot format. In some examples, the control message may include the scheduling request. The operations of 1515 may be performed according to the methods described herein. In some examples, aspects of the operations of 1515 may be performed by a slot format request manager as described with reference to FIGS. 4 through 7.

At 1520, the UE may receive, from the base station, an indication of a second slot format for communicating information over the communication resources based at least in part on transmitting the request. The operations of 1520 may be performed according to the methods described herein. In some examples, aspects of the operations of 1520 may be performed by a slot format manager as described with reference to FIGS. 4 through 7.

At 1525, the UE may communicate, with the base station, the information over the communication resources using the second slot format based at least in part on receiving the indication. The operations of 1525 may be performed according to the methods described herein. In some examples, aspects of the operations of 1525 may be performed by a half-duplex communications manager as described with reference to FIGS. 4 through 7.

Figure 16:
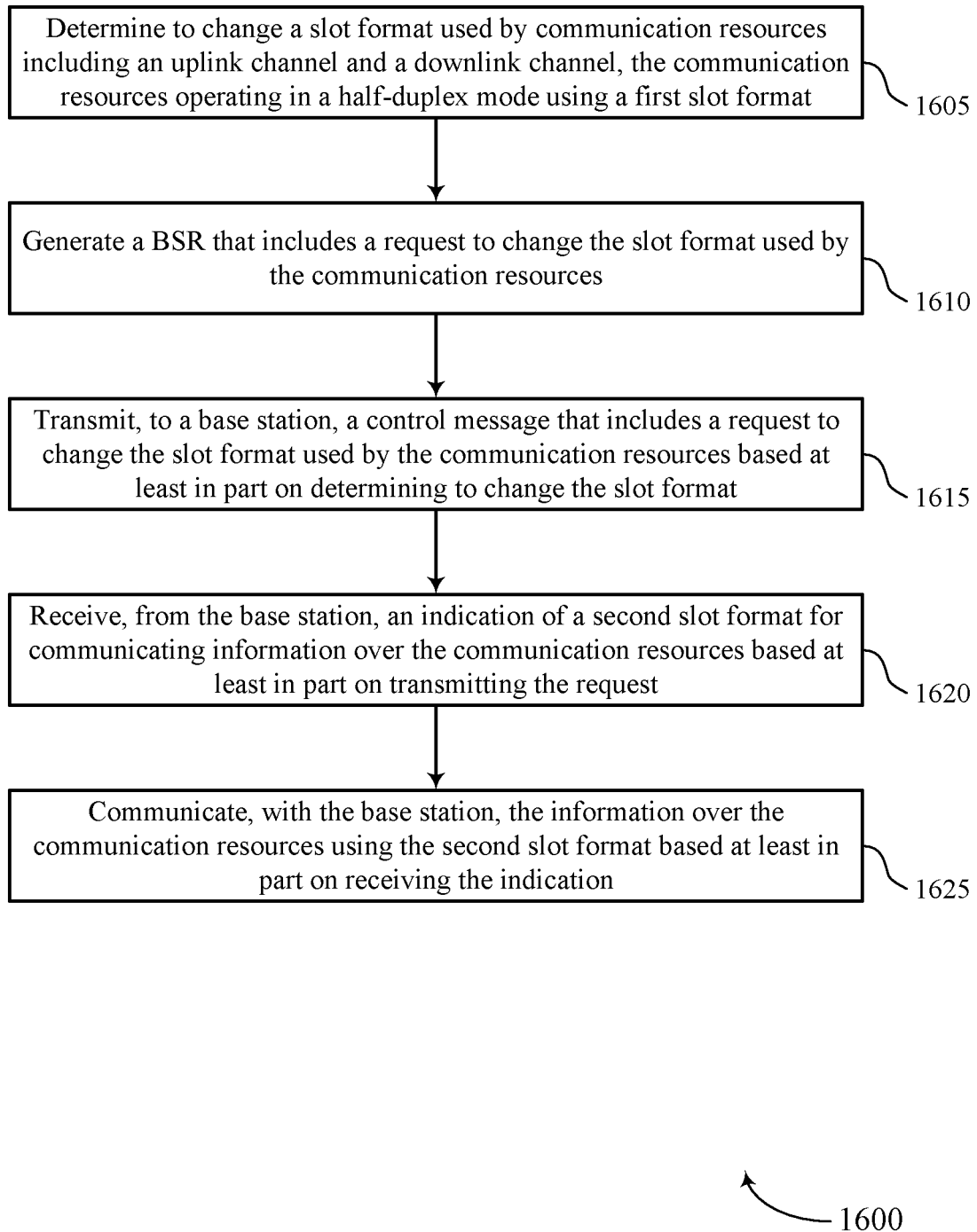

FIG. 16 shows a flowchart illustrating a method 1600 that supports signaling to adjust slot format in accordance with aspects of the present disclosure. The operations of method 1600 may be implemented by a UE 115 or its components as described herein. For example, the operations of method 1600 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1605, the UE may determine to change a slot format used by communication resources including an uplink channel and a downlink channel, the communication resources operating in a half-duplex mode using a first slot format. The operations of 1605 may be performed according to the methods described herein. In some examples, aspects of the operations of 1605 may be performed by a slot format manager as described with reference to FIGS. 4 through 7.

At 1610, the UE may generate a BSR (e.g., a C-BSR) that includes a request to change the slot format used by the communication resources. The operations of 1610 may be performed according to the methods described herein. In some examples, aspects of the operations of 1610 may be performed by a C-BSR manager as described with reference to FIGS. 4 through 7.

At 1615, the UE may transmit, to a base station, a control message that includes the request to change the slot format used by the communication resources based at least in part on determining to change the slot format. In some examples, the control message may include the BSR (e.g., the C-BSR). The operations of 1615 may be performed according to the methods described herein. In some examples, aspects of the operations of 1615 may be performed by a slot format request manager as described with reference to FIGS. 4 through 7.

At 1620, the UE may receive, from the base station, an indication of a second slot format for communicating information over the communication resources based at least in part on transmitting the request. The operations of 1620 may be performed according to the methods described herein. In some examples, aspects of the operations of 1620 may be performed by a slot format manager as described with reference to FIGS. 4 through 7.

At 1625, the UE may communicate, with the base station, the information over the communication resources using the second slot format based at least in part on receiving the indication. The operations of 1625 may be performed according to the methods described herein. In some examples, aspects of the operations of 1625 may be performed by a half-duplex communications manager as described with reference to FIGS. 4 through 7.

Figure 17:
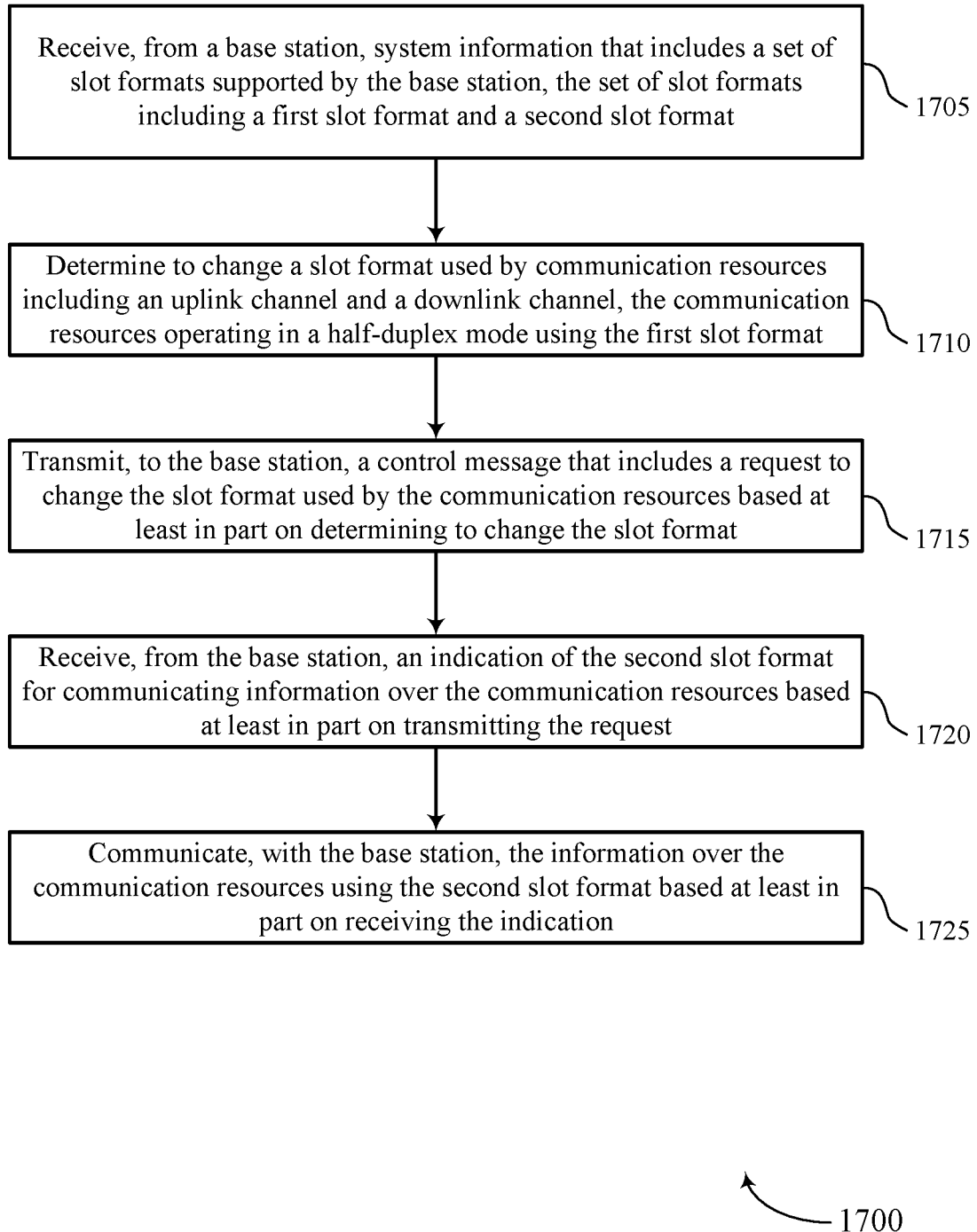

FIG. 17 shows a flowchart illustrating a method 1700 that supports signaling to adjust slot format in accordance with aspects of the present disclosure. The operations of method 1700 may be implemented by a UE 115 or its components as described herein. For example, the operations of method 1700 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1705, the UE may receive, from a base station, system information that includes a set of slot formats supported by the base station, the set of slot formats including a first slot format and a second slot format. The operations of 1705 may be performed according to the methods described herein. In some examples, aspects of the operations of 1705 may be performed by a system information manager as described with reference to FIGS. 4 through 7.

At 1710, the UE may determine to change a slot format used by communication resources including an uplink channel and a downlink channel, the communication resources operating in a half-duplex mode using the first slot format. The operations of 1710 may be performed according to the methods described herein. In some examples, aspects of the operations of 1710 may be performed by a slot format manager as described with reference to FIGS. 4 through 7.

At 1715, the UE may transmit, to the base station, a control message that includes a request to change the slot format used by the communication resources based at least in part on determining to change the slot format. The operations of 1715 may be performed according to the methods described herein. In some examples, aspects of the operations of 1715 may be performed by a slot format request manager as described with reference to FIGS. 4 through 7.

At 1720, the UE may receive, from the base station, an indication of the second slot format for communicating information over the communication resources based at least in part on transmitting the request. The operations of 1720 may be performed according to the methods described herein. In some examples, aspects of the operations of 1720 may be performed by a slot format manager as described with reference to FIGS. 4 through 7.

At 1725, the UE may communicate, with the base station, the information over the communication resources using the second slot format based at least in part on receiving the indication. The operations of 1725 may be performed according to the methods described herein. In some examples, aspects of the operations of 1725 may be performed by a half-duplex communications manager as described with reference to FIGS. 4 through 7.

Figure 18:
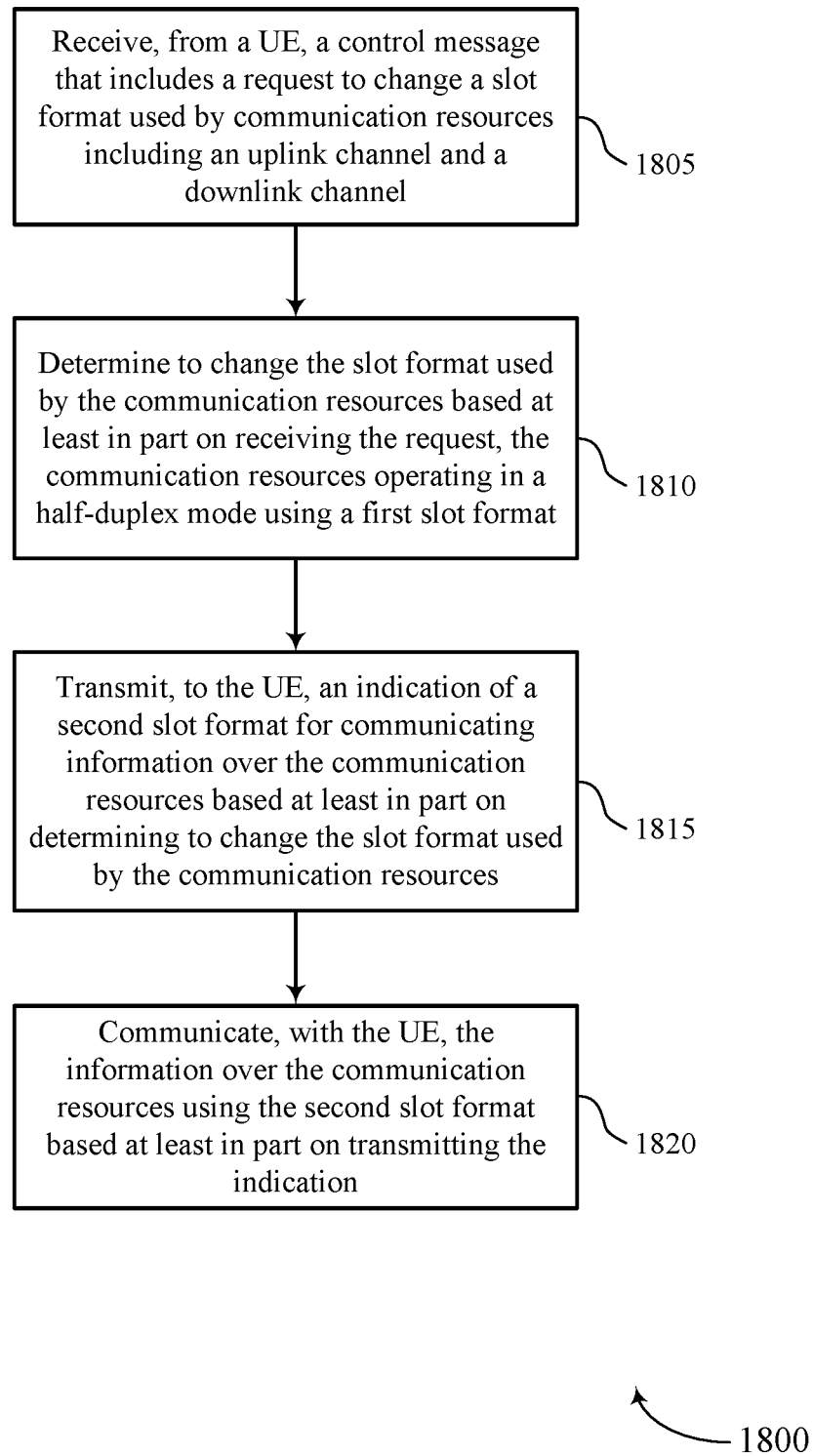

FIG. 18 shows a flowchart illustrating a method 1800 that supports signaling to adjust slot format in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, a control message that includes a request to change a slot format used by communication resources including an uplink channel and a downlink channel. The operations of 1805 may be performed according to the methods described herein. In some examples, aspects of the operations of 1805 may be performed by a slot format request manager as described with reference to FIGS. 8 through 11.

At 1810, the base station may determine to change the slot format used by the communication resources based at least in part on receiving the request, the communication resources operating in a half-duplex mode using a first slot format. The operations of 1810 may be performed according to the methods described herein. In some examples, aspects of the operations of 1810 may be performed by a slot format manager as described with reference to FIGS. 8 through 11.

At 1815, the base station may transmit, to the UE, an indication of a second slot format for communicating information over the communication resources based at least in part on determining to change the slot format used by the communication resources. The operations of 1815 may be performed according to the methods described herein. In some examples, aspects of the operations of 1815 may be performed by a slot format manager as described with reference to FIGS. 8 through 11.

At 1820, the base station may communicate, with the UE, the information over the communication resources using the second slot format based at least in part on transmitting the indication. The operations of 1820 may be performed according to the methods described herein. In some examples, aspects of the operations of 1820 may be performed by a half-duplex communications manager as described with reference to FIGS. 8 through 11.

Figure 19:
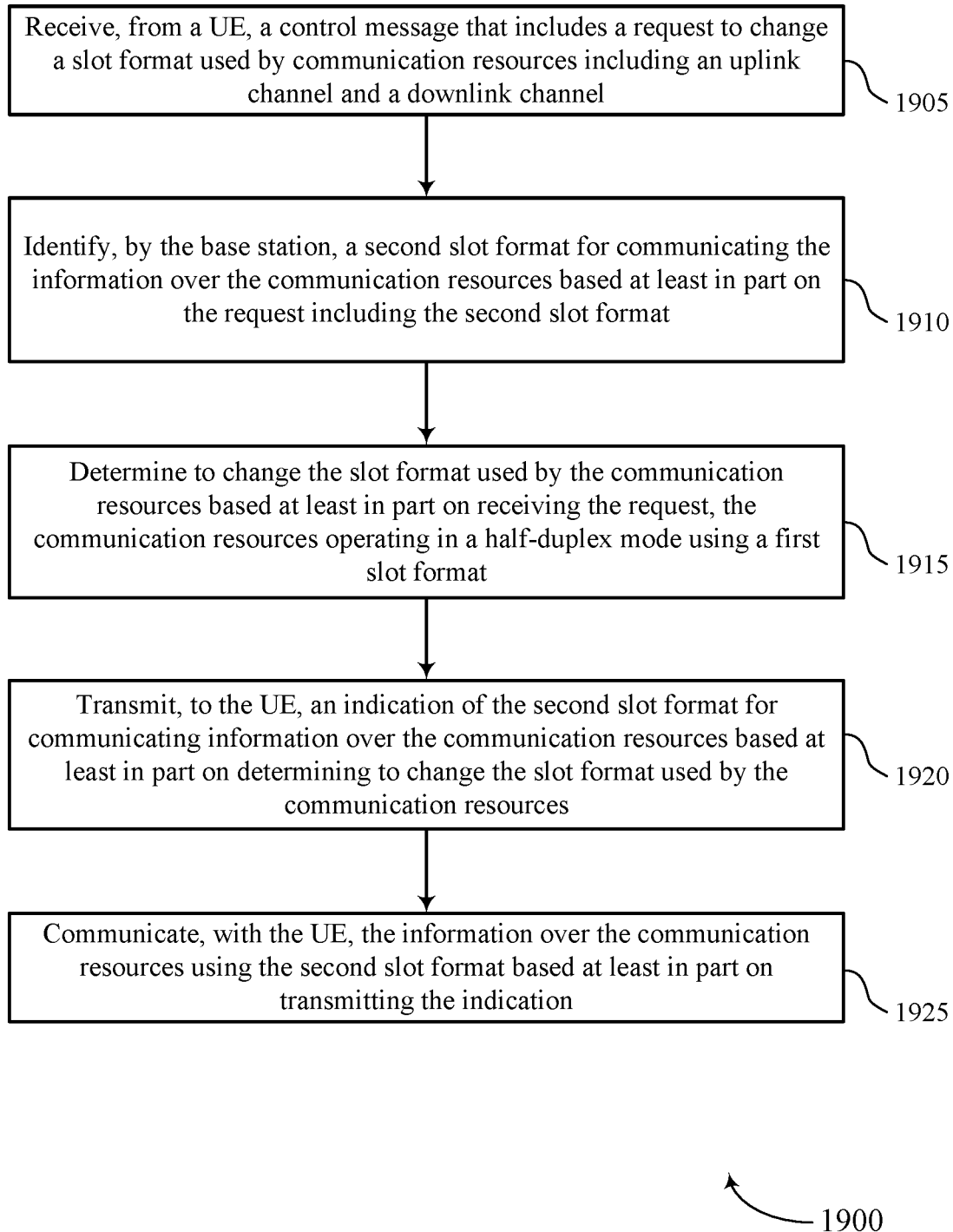

FIG. 19 shows a flowchart illustrating a method 1900 that supports signaling to adjust slot format in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1905, the base station may receive, from a UE, a control message that includes a request to change a slot format used by communication resources including an uplink channel and a downlink channel. The operations of 1905 may be performed according to the methods described herein. In some examples, aspects of the operations of 1905 may be performed by a slot format request manager as described with reference to FIGS. 8 through 11.

At 1910, the base station may identify, by the base station, a second slot format for communicating the information over the communication resources based at least in part on the request including the second slot format. The operations of 1910 may be performed according to the methods described herein. In some examples, aspects of the operations of 1910 may be performed by a slot format manager as described with reference to FIGS. 8 through 11.

At 1915, the base station may determine to change the slot format used by the communication resources based at least in part on receiving the request, the communication resources operating in a half-duplex mode using a first slot format. The operations of 1915 may be performed according to the methods described herein. In some examples, aspects of the operations of 1915 may be performed by a slot format manager as described with reference to FIGS. 8 through 11.

At 1920, the base station may transmit, to the UE, an indication of the second slot format for communicating information over the communication resources based at least in part on determining to change the slot format used by the communication resources. The operations of 1920 may be performed according to the methods described herein. In some examples, aspects of the operations of 1920 may be performed by a slot format manager as described with reference to FIGS. 8 through 11.

At 1925, the base station may communicate, with the UE, the information over the communication resources using the second slot format based at least in part on transmitting the indication. The operations of 1925 may be performed according to the methods described herein. In some examples, aspects of the operations of 1925 may be performed by a half-duplex communications manager as described with reference to FIGS. 8 through 11.

Figure 20:
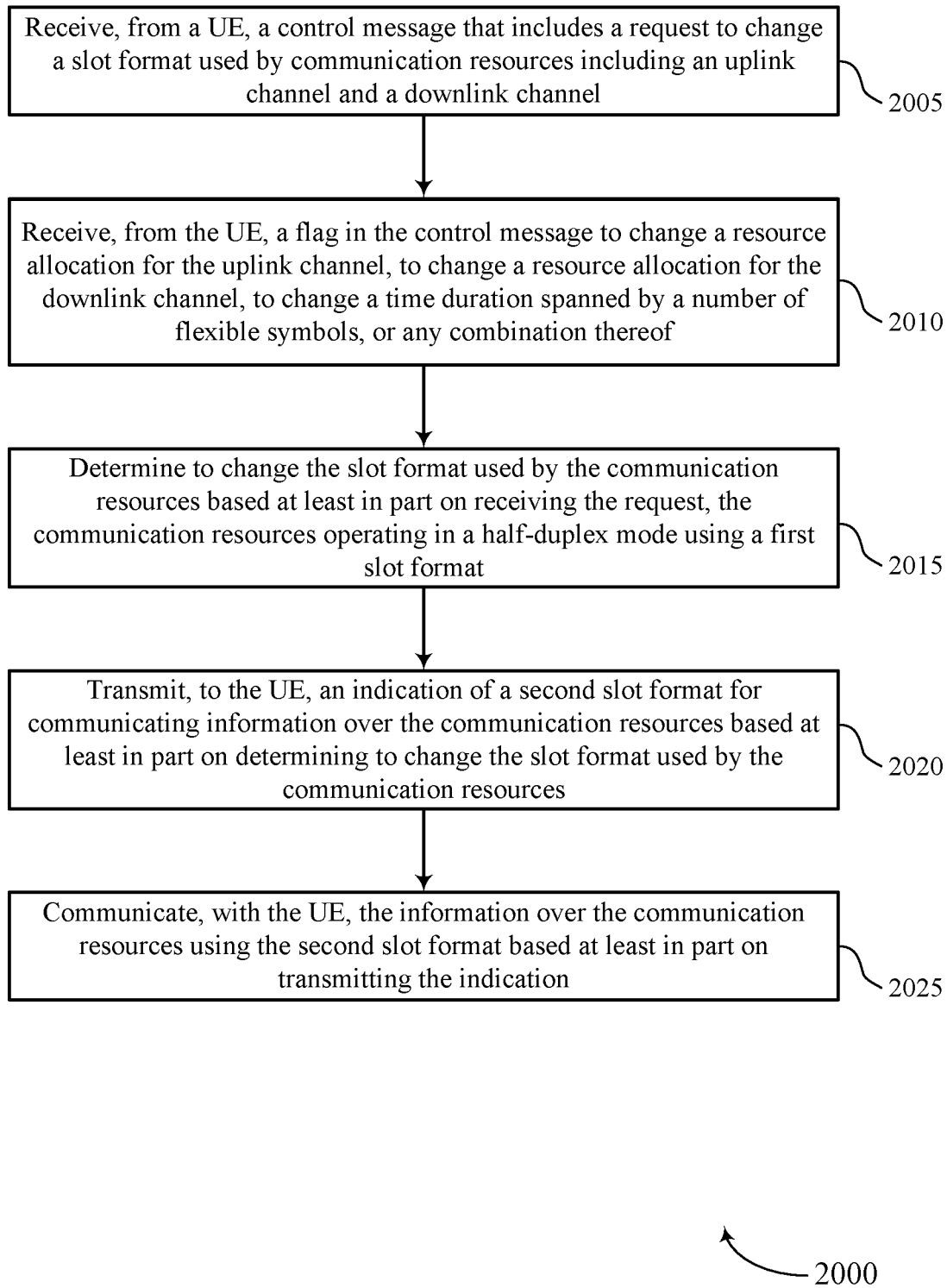

FIG. 20 shows a flowchart illustrating a method 2000 that supports signaling to adjust slot format in accordance with aspects of the present disclosure. The operations of method 2000 may be implemented by a base station 105 or its components as described herein. For example, the operations of method 2000 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2005, the base station may receive, from a UE, a control message that includes a request to change a slot format used by communication resources including an uplink channel and a downlink channel. The operations of 2005 may be performed according to the methods described herein. In some examples, aspects of the operations of 2005 may be performed by a slot format request manager as described with reference to FIGS. 8 through 11.

At 2010, the base station may receive, from the UE, a flag in the control message to change a resource allocation for the uplink channel, to change a resource allocation for the downlink channel, to change a time duration spanned by a number of flexible symbols, or any combination thereof. The operations of 2010 may be performed according to the methods described herein. In some examples, aspects of the operations of 2010 may be performed by a slot format request manager as described with reference to FIGS. 8 through 11.

At 2015, the base station may determine to change the slot format used by the communication resources based at least in part on receiving the request, the communication resources operating in a half-duplex mode using a first slot format. The operations of 2015 may be performed according to the methods described herein. In some examples, aspects of the operations of 2015 may be performed by a slot format manager as described with reference to FIGS. 8 through 11.

At 2020, the base station may transmit, to the UE, an indication of a second slot format for communicating information over the communication resources based at least in part on determining to change the slot format used by the communication resources. The operations of 2020 may be performed according to the methods described herein. In some examples, aspects of the operations of 2020 may be performed by a slot format manager as described with reference to FIGS. 8 through 11.

At 2025, the base station may communicate, with the UE, the information over the communication resources using the second slot format based at least in part on transmitting the indication. The operations of 2025 may be performed according to the methods described herein. In some examples, aspects of the operations of 2025 may be performed by a half-duplex communications manager as described with reference to FIGS. 8 through 11.

Figure 21:
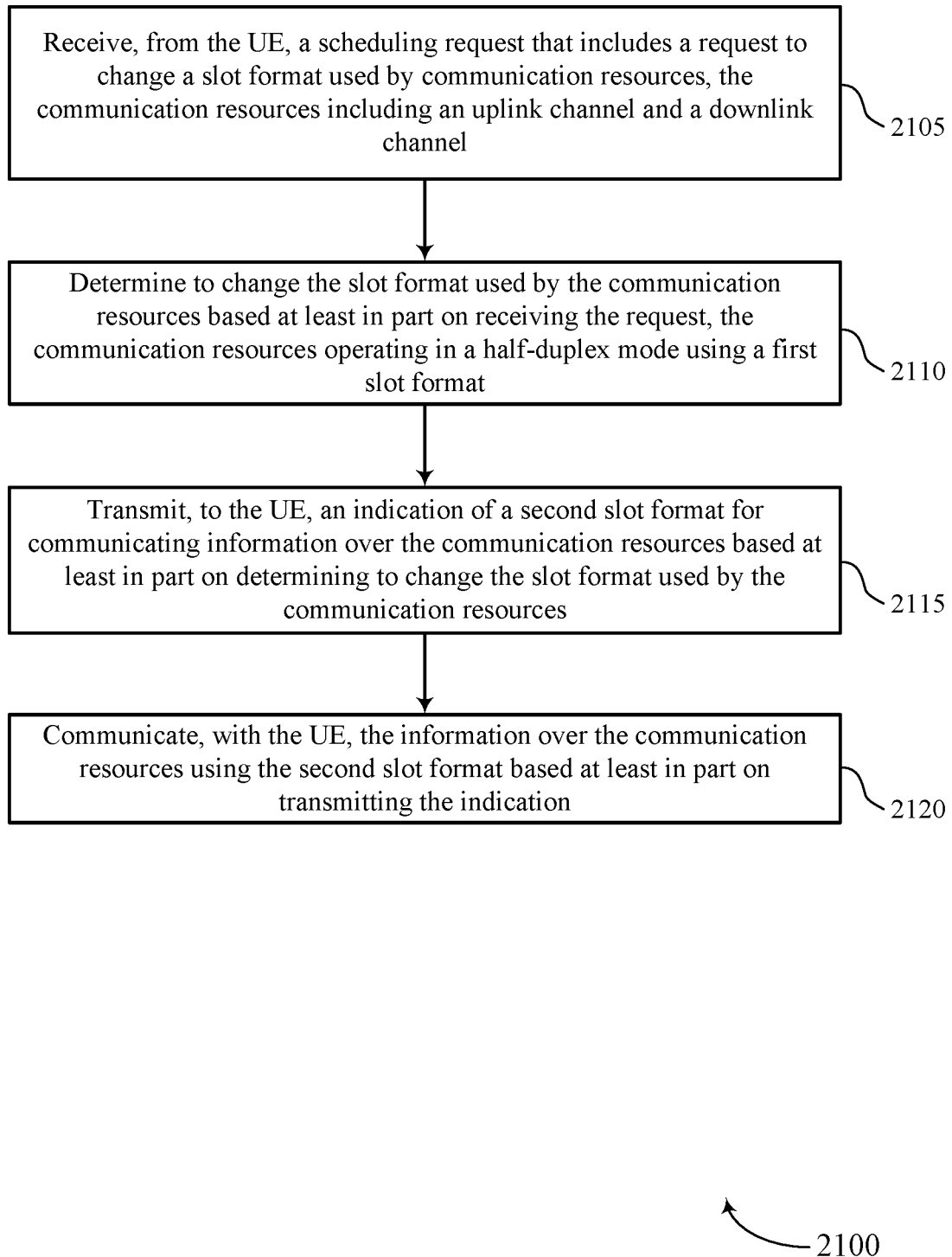

FIG. 21 shows a flowchart illustrating a method 2100 that supports signaling to adjust slot format in accordance with aspects of the present disclosure. The operations of method 2100 may be implemented by a base station 105 or its components as described herein. For example, the operations of method 2100 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2105, the base station may receive, from the UE, a scheduling request that includes a request to change a slot format used by communication resources, the communication resources including an uplink channel and a downlink channel. The operations of 2105 may be performed according to the methods described herein. In some examples, aspects of the operations of 2105 may be performed by a scheduling request manager as described with reference to FIGS. 8 through 11.

At 2110, the base station may determine to change the slot format used by the communication resources based at least in part on receiving the request, the communication resources operating in a half-duplex mode using a first slot format. The operations of 2110 may be performed according to the methods described herein. In some examples, aspects of the operations of 2110 may be performed by a slot format manager as described with reference to FIGS. 8 through 11.

At 2115, the base station may transmit, to the UE, an indication of a second slot format for communicating information over the communication resources based at least in part on determining to change the slot format used by the communication resources. In some examples, the base station may determine to change the slot format based on the scheduling request. The operations of 2115 may be performed according to the methods described herein. In some examples, aspects of the operations of 2115 may be performed by a slot format manager as described with reference to FIGS. 8 through 11.

At 2120, the base station may communicate, with the UE, the information over the communication resources using the second slot format based at least in part on transmitting the indication. The operations of 2120 may be performed according to the methods described herein. In some examples, aspects of the operations of 2120 may be performed by a half-duplex communications manager as described with reference to FIGS. 8 through 11.

Figure 22:
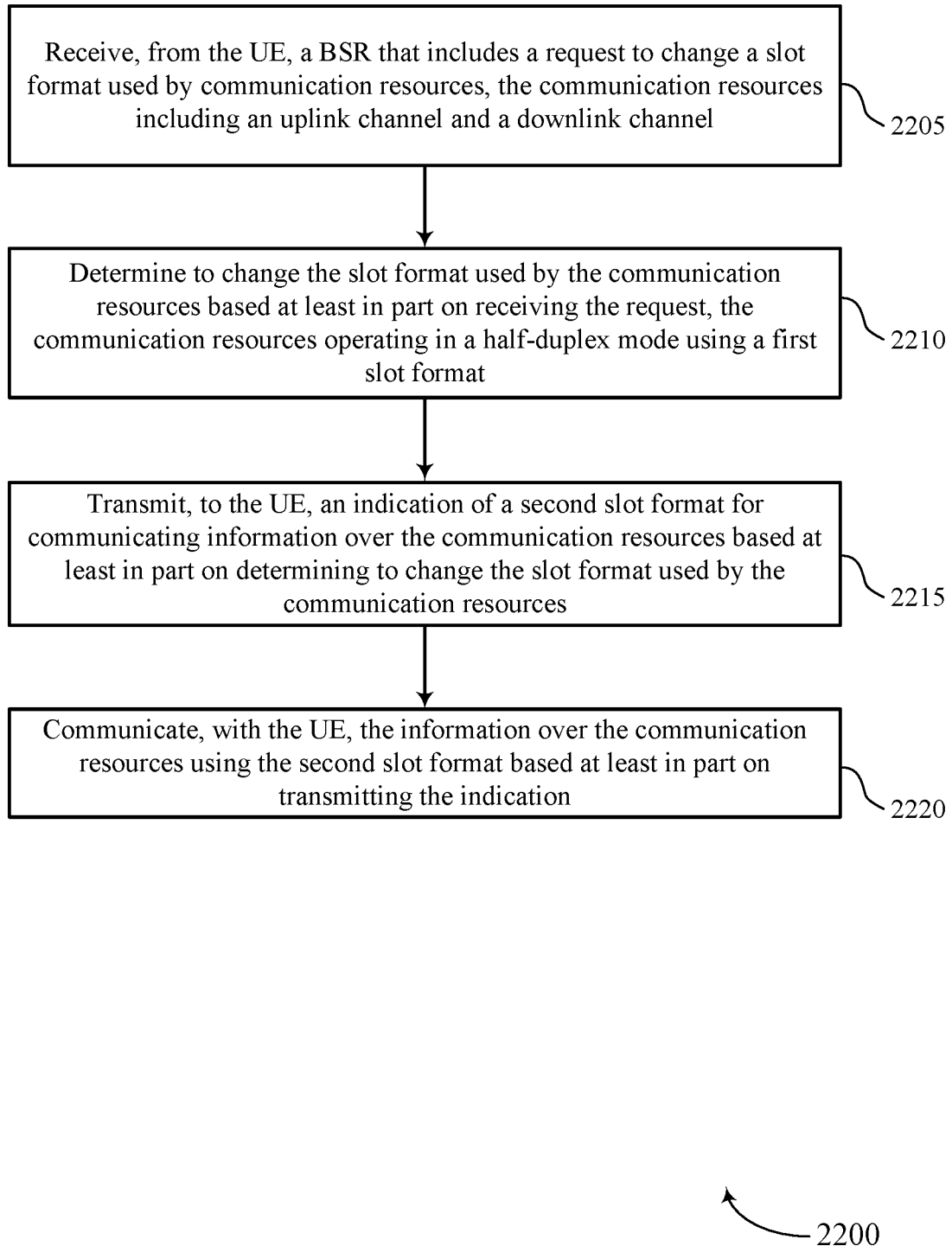

FIG. 22 shows a flowchart illustrating a method 2200 that supports signaling to adjust slot format in accordance with aspects of the present disclosure. The operations of method 2200 may be implemented by a base station 105 or its components as described herein. For example, the operations of method 2200 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2205, the base station may receive, from the UE, a BSR that includes a request to change a slot format used by communication resources, the communication resources including an uplink channel and a downlink channel. The operations of 2205 may be performed according to the methods described herein. In some examples, aspects of the operations of 2205 may be performed by a C-BSR manager as described with reference to FIGS. 8 through 11.

At 2210, the base station may determine to change the slot format used by the communication resources based at least in part on receiving the request, the communication resources operating in a half-duplex mode using a first slot format. The operations of 2210 may be performed according to the methods described herein. In some examples, aspects of the operations of 2210 may be performed by a slot format manager as described with reference to FIGS. 8 through 11.

At 2215, the base station may transmit, to the UE, an indication of a second slot format for communicating information over the communication resources based at least in part on determining to change the slot format used by the communication resources. The operations of 2215 may be performed according to the methods described herein. In some examples, aspects of the operations of 2215 may be performed by a slot format manager as described with reference to FIGS. 8 through 11.

At 2220, the base station may communicate, with the UE, the information over the communication resources using the second slot format based at least in part on transmitting the indication. The operations of 2220 may be performed according to the methods described herein. In some examples, aspects of the operations of 2220 may be performed by a half-duplex communications manager as described with reference to FIGS. 8 through 11.

Figure 23:
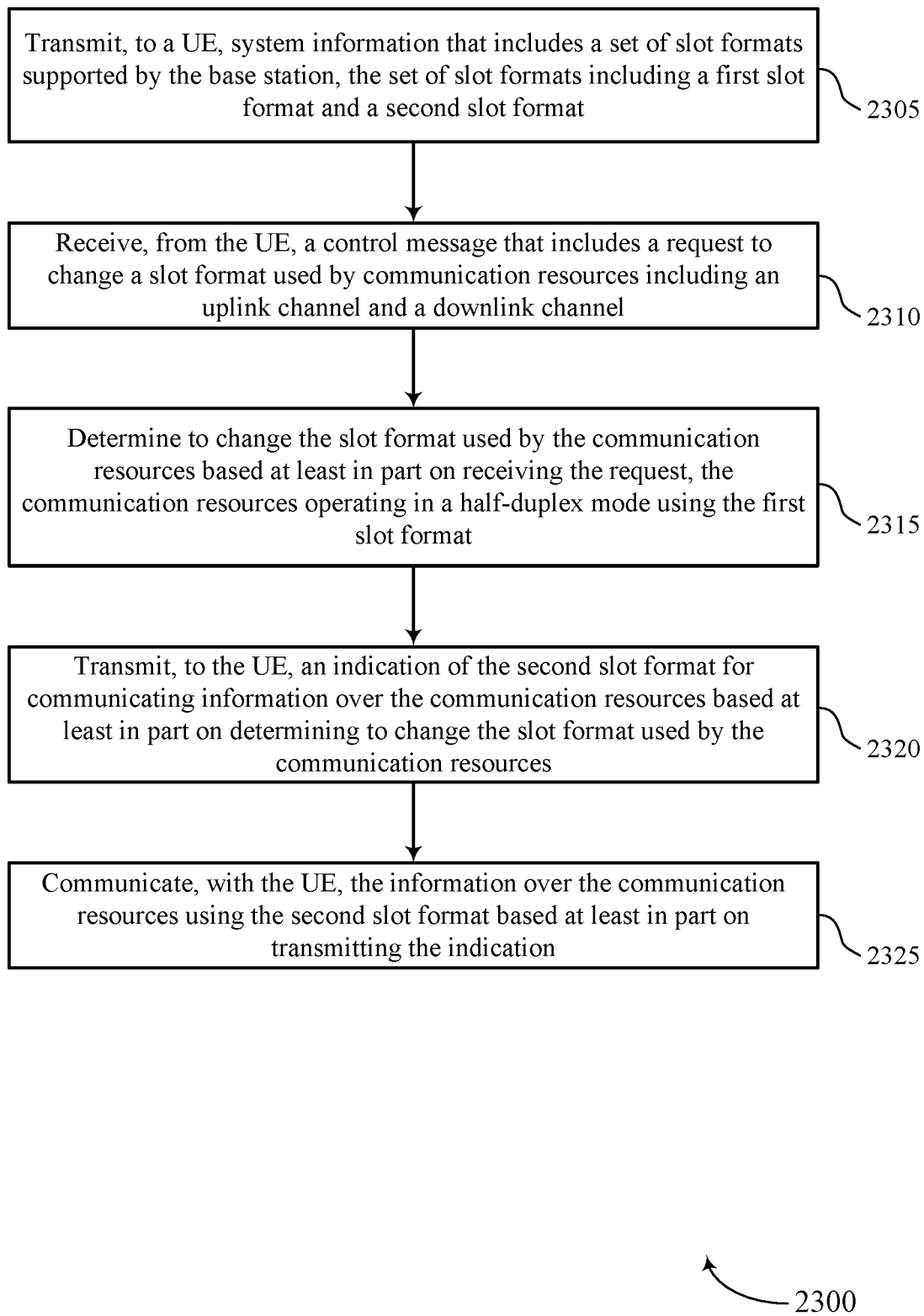

FIG. 23 shows a flowchart illustrating a method 2300 that supports signaling to adjust slot format in accordance with aspects of the present disclosure. The operations of method 2300 may be implemented by a base station 105 or its components as described herein. For example, the operations of method 2300 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 2305, the base station may transmit, to a UE, system information that includes a set of slot formats supported by the base station, the set of slot formats including a first slot format and a second slot format. The operations of 2305 may be performed according to the methods described herein. In some examples, aspects of the operations of 2305 may be performed by a system information manager as described with reference to FIGS. 8 through 11.

At 2310, the base station may receive, from the UE, a control message that includes a request to change a slot format used by communication resources including an uplink channel and a downlink channel. The operations of 2310 may be performed according to the methods described herein. In some examples, aspects of the operations of 2310 may be performed by a slot format request manager as described with reference to FIGS. 8 through 11.

At 2315, the base station may determine to change the slot format used by the communication resources based at least in part on receiving the request, the communication resources operating in a half-duplex mode using the first slot format. In some examples, determining to change the slot format is based on the set of slot formats supported by the base station. The operations of 2315 may be performed according to the methods described herein. In some examples, aspects of the operations of 2315 may be performed by a slot format manager as described with reference to FIGS. 8 through 11.

At 2320, the base station may transmit, to the UE, an indication of the second slot format for communicating information over the communication resources based at least in part on determining to change the slot format used by the communication resources. The operations of 2320 may be performed according to the methods described herein. In some examples, aspects of the operations of 2320 may be performed by a slot format manager as described with reference to FIGS. 8 through 11.

At 2325, the base station may communicate, with the UE, the information over the communication resources using the second slot format based at least in part on transmitting the indication. The operations of 2325 may be performed according to the methods described herein. In some examples, aspects of the operations of 2325 may be performed by a half-duplex communications manager as described with reference to FIGS. 8 through 11.

The following provides an overview of aspects of the present disclosure:

Aspect 1: A method for wireless communications at a UE, comprising: determining to change a slot format used by communication resources comprising an uplink channel and a downlink channel, the communication resources operating in a half-duplex mode using a first slot format; transmitting, to a base station, a control message that includes a request to change the slot format used by the communication resources based at least in part on determining to change the slot format; receiving, from the base station, an indication of a second slot format for communicating information over the communication resources based at least in part on transmitting the request; and communicating, with the base station, the information over the communication resources using the second slot format based at least in part on receiving the indication.

Aspect 2: The method of aspect 1, further comprising: selecting, by the UE, the second slot format for communicating the information over the communication resources, wherein transmitting the control message is based at least in part on selecting the second slot format, wherein the request to change the slot format used by the communication resources comprises the second slot format.

Aspect 3: The method of aspect 2, further comprising: determining an index value corresponding to the second slot format selected by the UE, wherein the request to change the slot format used by the communication resources comprises the index value.

Aspect 4: The method of aspect 3, further comprising: receiving, from the base station, system information that includes a plurality of slot formats supported by the base station, the plurality of slot formats including the first slot format and the second slot format, wherein determining to change the slot format is based at least in part on receiving the plurality of slot formats, wherein determining the index value corresponding to the second slot format is based at least in part on receiving the plurality of slot formats.

Aspect 5: The method of any of aspects 1 through 4, further comprising: determining, by the UE, to change a resource allocation for the uplink channel, to change a resource allocation for the downlink channel, to change a time duration spanned by a number of flexible symbols, or any combination thereof; and selecting a flag to include in the control message based at least in part on determining to change the resource allocation for the uplink channel, to change the resource allocation for the downlink channel, or to change the time duration spanned by the number of flexible symbols, or any combination thereof, wherein transmitting the control message is based at least in part on selecting the flag.

Aspect 6: The method of aspect 5, wherein selecting the flag comprises: selecting a first flag value based at least in part on determining to change the resource allocation for the uplink channel; selecting a second flag value based at least in part on determining to change the resource allocation for the downlink channel; or selecting a third flag value based at least in part on determining to change the time duration spanned by the number of flexible symbols.

Aspect 7: The method of any of aspects 1 through 6, further comprising: transmitting, to the base station, a flag in the control message to change a resource allocation for the uplink channel, to change a resource allocation for the downlink channel, or to change a time duration spanned by a number of flexible symbols, or any combination thereof, wherein the request to change the slot format used by the communication resources comprises the comprises the flag.

Aspect 8: The method of aspect 7, wherein the flag indicates changing a ratio of a first set of time-domain resources allocated to the uplink channel and a second set of time-domain resources allocated to the downlink channel, and a value of the flag is associated with one or more slot formats.

Aspect 9: The method of any of aspects 1 through 8, further comprising: generating a scheduling request including the request to change the slot format used by the communication resources, wherein the control message transmitted by the UE comprises the scheduling request.

Aspect 10: The method of aspect 9, further comprising: determining a quantity of resources for the uplink channel, wherein the request to change the slot format used by the communication resources includes the quantity of resources for the uplink channel and a timer to receive the indication of the second slot format or a second resource allocation.

Aspect 11: The method of any of aspects 1 through 8, further comprising: generating a BSR that includes the request to change the slot format used by the communication resources, wherein the control message transmitted by the UE comprises the BSR.

Aspect 12: The method of aspect 11, further comprising: receiving, from the base station, a mapping table associated with a mapping between an amount of the information in a data buffer and a second indication in the BSR, wherein generating the BSR is based at least in part on the mapping table.

Aspect 13: The method of any of aspects 11 through 12, further comprising: receiving, from the base station, a set of thresholds associated with a payload size of the control message, the BSR, an amount of the information in a data buffer, or any combination thereof, wherein generating the BSR is based at least in part on the set of thresholds.

Aspect 14: The method of any of aspects 11 through 13, wherein the BSR comprises a quantized or compressed BSR in an uplink control channel relative to a second BSR in an uplink shared channel.

Aspect 15: The method of any of aspects 11 through 14, further comprising: generating a timer to indicate a duration associated with receiving the indication of the second slot format, wherein the control message includes the timer.

Aspect 16: The method of any of aspects 1 through 15, further comprising: receiving, from the base station, system information that includes a plurality of slot formats supported by the base station, the plurality of slot formats including the first slot format and the second slot format, wherein determining to change the slot format is based at least in part on receiving the system information that includes the plurality of slot formats.

Aspect 17: The method of aspect 16, wherein receiving the indication of the second slot format comprises: receiving, from the base station, DCI that includes the indication of the second slot format, wherein the indication of the second slot format is an index into a memory at the UE corresponding to the second slot format.

Aspect 18: The method of any of aspects 1 through 17, further comprising: transmitting, to the base station, a second control message that includes a second request to change the slot format used by the communication resources to a default slot format based at least in part on a completion of communicating the information over the communication resources using the second slot format.

Aspect 19: The method of any of aspects 1 through 18, further comprising: determining a timer associated with receiving the indication of the second slot format, wherein the timer corresponds to a duration during which the UE may receive the indication of the second slot format, wherein transmitting the request to change the slot format is based at least in part on determining the timer associated with receiving the indication of the second slot format.

Aspect 20: The method of any of aspects 1 through 19, wherein determining to change the slot format used by the communication resources is based at least in part on an amount of the information or a channel quality, or both.

Aspect 21: The method of any of aspects 1 through 20, wherein the indication is received via RRC signaling.

Aspect 22: The method of any of aspects 1 through 21, wherein the half-duplex mode of the communication resources comprises a half-duplex FDD mode.

Aspect 23: The method of any of aspects 1 through 22, wherein the control message comprises a UCI message, a MAC-CE, or an RRC message.

Aspect 24: The method of any of aspects 1 through 23, wherein the request to change the slot format used by the communication resources is multiplexed with one or more other fields in the control message.

Aspect 25: The method of any of aspects 1 through 24, wherein the request to change the slot format is transmitted using the first slot format.

Aspect 26: A method for wireless communications at a base station, comprising: receiving, from a UE, a control message that includes a request to change a slot format used by communication resources comprising an uplink channel and a downlink channel; determining to change the slot format used by the communication resources based at least in part on receiving the request, the communication resources operating in a half-duplex mode using a first slot format; transmitting, to the UE, an indication of a second slot format for communicating information over the communication resources based at least in part on determining to change the slot format used by the communication resources; and communicating, with the UE, the information over the communication resources using the second slot format based at least in part on transmitting the indication.

Aspect 27: The method of aspect 26, further comprising: identifying, by the base station, the second slot format for communicating the information over the communication resources based at least in part on the request including the second slot format, wherein transmitting the indication of the second slot format is based at least in part on identifying the second slot format.

Aspect 28: The method of aspect 27, further comprising: determining an index value corresponding to the second slot format, wherein identifying the second slot format is based at least in part on determining the index value, wherein the request to change the slot format used by the communication resources comprises the index value.

Aspect 29: The method of aspect 28, further comprising: transmitting, to the UE, system information that includes a plurality of slot formats supported by the base station, the plurality of slot formats including the first slot format and the second slot format, wherein determining the index value corresponding to the second slot format is based at least in part on the plurality of slot formats.

Aspect 30: The method of any of aspects 26 through 29, further comprising: receiving, from the UE, a flag in the control message to change a resource allocation for the uplink channel, to change a resource allocation for the downlink channel, to change a time duration spanned by a number of flexible symbols, or any combination thereof, wherein the request to change the slot format used by the communication resources comprises the flag.

Aspect 31: The method of aspect 30, wherein the flag indicates changing a ratio of a first set of time-domain resources allocated to the uplink channel and a second set of time-domain resources allocated to the downlink channel.

Aspect 32: The method of any of aspects 26 through 31, further comprising: receiving, from the UE, a scheduling request that includes the request to change the slot format used by the communication resources, wherein the control message received from the UE comprises the scheduling request, wherein determining to change the slot format is based at least in part on receiving the scheduling request.

Aspect 33: The method of aspect 32, further comprising: determining a quantity of resources for the uplink channel, wherein the request to change the slot format used by the communication resources includes the quantity of resources for the uplink channel and a timer to receive the indication of the second slot format or a second resource allocation.

Aspect 34: The method of any of aspects 26 through 31, further comprising: receiving, from the UE, a BSR that includes the request to change the slot format used by the communication resources, wherein the control message received from the UE comprises the BSR.

Aspect 35: The method of aspect 34, further comprising: transmitting, to the UE, a mapping table associated with a mapping between an amount of the information in a data buffer and a second indication in the BSR, wherein the BSR is based at least in part on the mapping table.

Aspect 36: The method of any of aspects 34 through 35, further comprising: transmitting, to the UE, a set of thresholds associated with a payload size of the control message, the BSR, an amount of the information in a data buffer, or any combination thereof, wherein the BSR is based at least in part on the set of thresholds.

Aspect 37: The method of any of aspects 34 through 36, wherein the BSR comprises a quantized or compressed BSR in an uplink control channel relative to a second BSR in an uplink shared channel.

Aspect 38: The method of any of aspects 34 through 37, further comprising: generating a timer to indicate a duration associated with transmitting the indication of the second slot format, wherein the control message includes the timer.

Aspect 39: The method of any of aspects 26 through 38, further comprising: transmitting, to the UE, system information that includes a plurality of slot formats supported by the base station, the plurality of slot formats including the first slot format and the second slot format, wherein determining to change the slot format is based at least in part on transmitting the system information that includes the plurality of slot formats.

Aspect 40: The method of aspect 39, wherein transmitting the indication of the second slot format comprises: transmitting, to the UE, DCI that includes the indication of the second slot format, wherein the indication of the second slot format is an index into a memory at the UE corresponding to the second slot format.

Aspect 41: The method of any of aspects 26 through 40, further comprising: receiving, from the UE, a second control message that includes a second request to change the slot format used by the communication resources to a default slot format based at least in part on a completion of communicating the information over the communication resources using the second slot format.

Aspect 42: The method of any of aspects 26 through 41, further comprising: determining a timer associated with transmitting the indication of the second slot format, wherein the timer corresponds to a duration during which the base station may transmit the indication of the second slot format, wherein receiving the request to change the slot format is based at least in part on determining the timer associated with transmitting the indication of the second slot format.

Aspect 43: The method of any of aspects 26 through 42, wherein the indication is received via RRC signaling.

Aspect 44: The method of any of aspects 26 through 43, wherein the half-duplex mode of the communication resources comprises a half-duplex FDD mode.

Aspect 45: The method of any of aspects 26 through 44, wherein the control message comprises a UCI message, a MAC-CE, or an RRC message.

Aspect 46: The method of any of aspects 26 through 45, wherein the request to change the slot format used by the communication resources is multiplexed with one or more other fields in the control message.

Aspect 47: The method of any of aspects 26 through 46, wherein the request to change the slot format is received using the first slot format.

Aspect 48: An apparatus for wireless communications at a UE, comprising at least one processor; memory coupled with the at least one processor; and instructions stored in the memory and executable by the at least one processor to cause the apparatus to perform a method of any of aspects 1 through 25.

Aspect 49: An apparatus for wireless communications at a UE, comprising at least one means for performing a method of any of aspects 1 through 25.

Aspect 50: A non-transitory computer-readable medium storing code for wireless communications at a UE, the code comprising instructions executable by at least one processor to perform a method of any of aspects 1 through 25.

Aspect 51: An apparatus for wireless communications at a base station, comprising at least one processor; memory coupled with the at least one processor; and instructions stored in the memory and executable by the at least one processor to cause the apparatus to perform a method of any of aspects 26 through 47.

Aspect 52: An apparatus for wireless communications at a base station, comprising at least one means for performing a method of any of aspects 26 through 47.

Aspect 53: A non-transitory computer-readable medium storing code for wireless communications at a base station, the code comprising instructions executable by at least one processor to perform a method of any of aspects 26 through 47.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

A wireless network, for example a wireless local area network (WLAN), such as a Wi-Fi (i.e., IEEE 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   at least one processor,
   memory coupled to the at least one processor; and
   instructions stored in the memory and capable of configuring by the at least one processor to cause the apparatus to:

determine to change a slot format used by communication resources comprising an uplink channel and a downlink channel, the communication resources operating in a half-duplex mode using a first slot format;

transmit, to a network node, a control message that includes a request to change the slot format used by the communication resources based at least in part on determining to change the slot format;

receive, from the network node, an indication of a second slot format for communicating information over the communication resources based at least in part on transmitting the request; and communicate, with the network node, the information over the communication resources using the second slot format based at least in part on receiving the indication.

2. The apparatus of claim 1, wherein the instructions are further capable of configuring by the at least one processor to cause the apparatus to:

select, by the UE, the second slot format for communicating the information over the communication resources, wherein transmitting the control message is based at least in part on selecting the second slot format, wherein the request to change the slot format used by the communication resources comprises the second slot format.

3. The apparatus of claim 2, wherein the instructions are further capable of configuring by the at least one processor to cause the apparatus to:

determine an index value corresponding to the second slot format selected by the UE, wherein the request to change the slot format used by the communication resources comprises the index value.

4. The apparatus of claim 3, wherein the instructions are further capable of configuring by the at least one processor to cause the apparatus to:

receive, from the network node, system information that includes a plurality of slot formats supported by the network node, the plurality of slot formats including the first slot format and the second slot format, wherein determining to change the slot format is based at least in part on receiving the plurality of slot formats, wherein determining the index value corresponding to the second slot format is based at least in part on receiving the plurality of slot formats.

5. The apparatus of claim 1, wherein the instructions are further capable of configuring by the at least one processor to cause the apparatus to:

determine, by the UE, to change a resource allocation for the uplink channel, to change a resource allocation for the downlink channel, to change a time duration spanned by a number of flexible symbols, or any combination thereof; and select a flag to include in the control message based at least in part on determining to change the resource allocation for the uplink channel, to change the resource allocation for the downlink channel, or to change the time duration spanned by the number of flexible symbols, or any combination thereof, wherein transmitting the control message is based at least in part on selecting the flag.

6. The apparatus of claim 5, wherein the instructions to select the flag are capable of configuring by the at least one processor to cause the apparatus to:

select a first flag value based at least in part on determining to change the resource allocation for the uplink channel;

select a second flag value based at least in part on determining to change the resource allocation for the downlink channel; or select a third flag value based at least in part on determining to change the time duration spanned by the number of flexible symbols.

7. The apparatus of claim 1, wherein the instructions are further capable of configuring by the at least one processor to cause the apparatus to:

transmit, to the network node, a flag in the control message to change a resource allocation for the uplink channel, to change a resource allocation for the downlink channel, or to change a time duration spanned by a number of flexible symbols, or any combination thereof, wherein the request to change the slot format used by the communication resources comprises the flag.

8. The apparatus of claim 7, wherein the flag indicates changing a ratio of a first set of time-domain resources allocated to the uplink channel and a second set of time-domain resources allocated to the downlink channel, and wherein a value of the flag is associated with one or more slot formats.

9. The apparatus of claim 1, wherein the instructions are further capable of configuring by the at least one processor to cause the apparatus to:

generate a scheduling request including the request to change the slot format used by the communication resources, wherein the control message transmitted by the UE comprises the scheduling request.

10. The apparatus of claim 9, wherein the instructions are further capable of configuring by the at least one processor to cause the apparatus to:

determine a quantity of resources for the uplink channel, wherein the request to change the slot format used by the communication resources includes the quantity of resources for the uplink channel and a timer to receive the indication of the second slot format or a second resource allocation.

11. The apparatus of claim 1, wherein the instructions are further capable of configuring by the at least one processor to cause the apparatus to:

generate a buffer status report that includes the request to change the slot format used by the communication resources, wherein the control message transmitted by the UE comprises the buffer status report.

12. The apparatus of claim 11, wherein the instructions are further capable of configuring by the at least one processor to cause the apparatus to:

receive, from the network node, a mapping table associated with a mapping between an amount of the information in a data buffer and a second indication in the buffer status report, wherein generating the buffer status report is based at least in part on the mapping table.

13. The apparatus of claim 11, wherein the instructions are further capable of configuring by the at least one processor to cause the apparatus to:

receive, from the network node, a set of thresholds associated with a payload size of the control message, the buffer status report, an amount of the information in a data buffer, or any combination thereof, wherein generating the buffer status report is based at least in part on the set of thresholds.

14. The apparatus of claim 11, wherein the buffer status report comprises a quantized or compressed buffer status report in an uplink control channel relative to a second buffer status report in an uplink shared channel.

15. The apparatus of claim 11, wherein the instructions are further capable of configuring by the at least one processor to cause the apparatus to:
generate a timer to indicate a duration associated with receiving the indication of the second slot format, wherein the control message includes the timer.

16. The apparatus of claim 1, wherein the instructions are further capable of configuring by the at least one processor to cause the apparatus to:
receive, from the network node, system information that includes a plurality of slot formats supported by the network node, the plurality of slot formats including the first slot format and the second slot format, wherein determining to change the slot format is based at least in part on receiving the system information that includes the plurality of slot formats.

17. The apparatus of claim 16, wherein the instructions to receive the indication of the second slot format are capable of configuring by the at least one processor to cause the apparatus to:
receive, from the network node, downlink control information that includes the indication of the second slot format, wherein the indication of the second slot format is an index into a memory at the UE corresponding to the second slot format.

18. The apparatus of claim 1, wherein the instructions are further capable of configuring by the at least one processor to cause the apparatus to:
transmit, to the network node, a second control message that includes a second request to change the slot format used by the communication resources to a default slot format based at least in part on a completion of communicating the information over the communication resources using the second slot format.

19. The apparatus of claim 1, wherein the instructions are further capable of configuring by the at least one processor to cause the apparatus to:
determine a timer associated with receiving the indication of the second slot format, wherein the timer corresponds to a duration during which the UE may receive the indication of the second slot format, wherein transmitting the request to change the slot format is based at least in part on determining the timer associated with receiving the indication of the second slot format.

20. The apparatus of claim 1, wherein determining to change the slot format used by the communication resources is based at least in part on an amount of the information or a channel quality, or both.

21. The apparatus of claim 1, wherein the half-duplex mode of the communication resources comprises a half-duplex frequency division duplexing (FDD) mode.

22. The apparatus of claim 1, wherein the request to change the slot format used by the communication resources is multiplexed with one or more other fields in the control message.

23. An apparatus for wireless communications at a network node, comprising:
at least one processor,
memory coupled to the at least one processor; and
instructions stored in the memory and capable of configuring by the at least one processor to cause the apparatus to:
receive, from a user equipment (UE), a control message that includes a request to change a slot format used by communication resources comprising an uplink channel and a downlink channel;
determine to change the slot format used by the communication resources based at least in part on receiving the request, the communication resources operating in a half-duplex mode using a first slot format;
transmit, to the UE, an indication of a second slot format for communicating information over the communication resources based at least in part on determining to change the slot format used by the communication resources; and
communicate, with the UE, the information over the communication resources using the second slot format based at least in part on transmitting the indication.

24. The apparatus of claim 23, wherein the instructions are further capable of configuring by the at least one processor to cause the apparatus to:
identify, by the network node, the second slot format for communicating the information over the communication resources based at least in part on the request including the second slot format, wherein transmitting the indication of the second slot format is based at least in part on identifying the second slot format.

25. The apparatus of claim 24, wherein the instructions are further capable of configuring by the at least one processor to cause the apparatus to:
determine an index value corresponding to the second slot format, wherein identifying the second slot format is based at least in part on determining the index value, wherein the request to change the slot format used by the communication resources comprises the index value.

26. The apparatus of claim 25, wherein the instructions are further capable of configuring by the at least one processor to cause the apparatus to:
transmit, to the UE, system information that includes a plurality of slot formats supported by the network node, the plurality of slot formats including the first slot format and the second slot format, wherein determining the index value corresponding to the second slot format is based at least in part on the plurality of slot formats.

27. A method for wireless communications at a user equipment (UE), comprising:
determining to change a slot format used by communication resources comprising an uplink channel and a downlink channel, the communication resources operating in a half-duplex mode using a first slot format;
transmitting, to a network node, a control message that includes a request to change the slot format used by the communication resources based at least in part on determining to change the slot format;
receiving, from the network node, an indication of a second slot format for communicating information over the communication resources based at least in part on transmitting the request; and
communicating, with the network node, the information over the communication resources using the second slot format based at least in part on receiving the indication.

28. The method of claim 27, further comprising:
selecting, by the UE, the second slot format for communicating the information over the communication resources, wherein transmitting the control message is based at least in part on selecting the second slot format, wherein the request to change the slot format used by the communication resources comprises the second slot format.

29. The method of claim 27, further comprising:

determining, by the UE, to change a resource allocation for the uplink channel, to change a resource allocation for the downlink channel, to change a time duration spanned by a number of flexible symbols, or any combination thereof; and selecting a flag to include in the control message based at least in part on determining to change the resource allocation for the uplink channel, to change the resource allocation for the downlink channel, or to change the time duration spanned by the number of flexible symbols, or any combination thereof, wherein transmitting the control message is based at least in part on selecting the flag.

30. A method for wireless communications at a network node, comprising:

receiving, from a user equipment (UE), a control message that includes a request to change a slot format used by communication resources comprising an uplink channel and a downlink channel;

determining to change the slot format used by the communication resources based at least in part on receiving the request, the communication resources operating in a half-duplex mode using a first slot format;

transmitting, to the UE, an indication of a second slot format for communicating information over the communication resources based at least in part on determining to change the slot format used by the communication resources; and communicating, with the UE, the information over the communication resources using the second slot format based at least in part on transmitting the indication.

\* \* \* \* \*